(12) United States Patent
Maggiore et al.

(10) Patent No.: US 11,326,886 B2
(45) Date of Patent: May 10, 2022

(54) METHOD FOR CONTROLLING DISSEMINATION OF INSTRUCTIONAL CONTENT TO OPERATORS PERFORMING PROCEDURES AT EQUIPMENT WITHIN A FACILITY

(71) Applicant: Apprentice FS, Inc., Port Jefferson Station, NY (US)

(72) Inventors: Frank Maggiore, Port Jefferson Station, NY (US); Angelo Stracquatanio, Port Jefferson Station, NY (US); Sam Brewton Lee Crumpton, Port Jefferson Station, NY (US); Russell Hirschorn, Port Jefferson Station, NY (US); Ali Jaafar, Port Jefferson Station, NY (US); Nabil Hajj Chehade, Port Jefferson Station, NY (US)

(73) Assignee: Apprentice FS, Inc., Port Jefferson Station, NY (US)

( * ) Notice: Subject to any disclaimer, the term of this patent is extended or adjusted under 35 U.S.C. 154(b) by 500 days.

(21) Appl. No.: 16/386,178

(22) Filed: Apr. 16, 2019

(65) Prior Publication Data

US 2019/0316912 A1    Oct. 17, 2019

Related U.S. Application Data

(60) Provisional application No. 62/658,562, filed on Apr. 16, 2018.

(51) Int. Cl.
| | |
|---|---|
| *G01C 21/20* | (2006.01) |
| *H04W 4/029* | (2018.01) |
| *G06F 3/16* | (2006.01) |

(52) U.S. Cl.
CPC .......... *G01C 21/206* (2013.01); *G06F 3/167* (2013.01); *H04W 4/029* (2018.02)

(58) Field of Classification Search
CPC ..... G01C 21/206; G01C 21/20; H04W 4/029; G06F 3/167; G06F 3/16
See application file for complete search history.

(56) References Cited

U.S. PATENT DOCUMENTS

| | | | | |
|---|---|---|---|---|
| 2001/0017023 A1* | 8/2001 | Armington | ............. | B65B 61/22 53/472 |
| 2002/0104293 A1* | 8/2002 | Armington | ............. | B65B 55/20 53/472 |

(Continued)

*Primary Examiner* — Jennifer N Welch
*Assistant Examiner* — Qi Wan
(74) *Attorney, Agent, or Firm* — Run8 Patent Group, LLC; Peter Miller; Alexander Rodriguez

(57) ABSTRACT

One variation of a method for controlling dissemination of instructional content to operators performing procedures at equipment within a facility includes: at a computing device, accessing a digital procedure containing a first instructional block comprising a first instruction in a set of formats including a text format corresponding to a first degree of guidance, an audio format corresponding to a second degree of guidance different from the first degree, and a visual format corresponding to a third degree of guidance greater than the first and second degrees; accessing a minimum instruction guidance specification for a current instance of the digital procedure; and, in response to initiation of the first instructional block in the digital procedure, presenting the first instruction in a particular format, in the set of formats, corresponding to a particular degree of guidance approximating the minimum instruction guidance specification.

22 Claims, 6 Drawing Sheets

(56) References Cited

U.S. PATENT DOCUMENTS

| | | | | |
|---|---|---|---|---|
| 2007/0218432 | A1* | 9/2007 | Glass | G09B 5/04 434/156 |
| 2008/0309463 | A1* | 12/2008 | Godzwon | G06K 7/0008 340/10.1 |
| 2009/0249353 | A1* | 10/2009 | Siegwart | G06N 7/005 718/106 |
| 2016/0027019 | A1* | 1/2016 | Michaelangelo | G06Q 10/06316 705/7.26 |
| 2016/0162772 | A1* | 6/2016 | Curtis | G06K 19/0727 345/8 |
| 2018/0017959 | A1* | 1/2018 | Pan | G05B 23/0216 |
| 2018/0136639 | A1* | 5/2018 | Sekimoto | G05B 19/425 |
| 2018/0159979 | A1* | 6/2018 | Amir | G06T 11/60 |
| 2018/0367474 | A1* | 12/2018 | Hernandez Santisteban | H04L 67/141 |
| 2020/0242952 | A1* | 7/2020 | Clinton | G09B 5/12 |

* cited by examiner

METHOD FOR CONTROLLING DISSEMINATION OF INSTRUCTIONAL CONTENT TO OPERATORS PERFORMING PROCEDURES AT EQUIPMENT WITHIN A FACILITY

CROSS-REFERENCE TO RELATED APPLICATIONS

This Application claims the benefit of U.S. Provisional Application No. 62/658,562, filed on 16 Apr. 2018, which is incorporated in its entirety by this reference.

TECHNICAL FIELD

This invention relates generally to the field of equipment maintenance and more specifically to a new and useful method for controlling dissemination of instructional content to operators performing procedures at equipment within a facility in the field of equipment maintenance.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
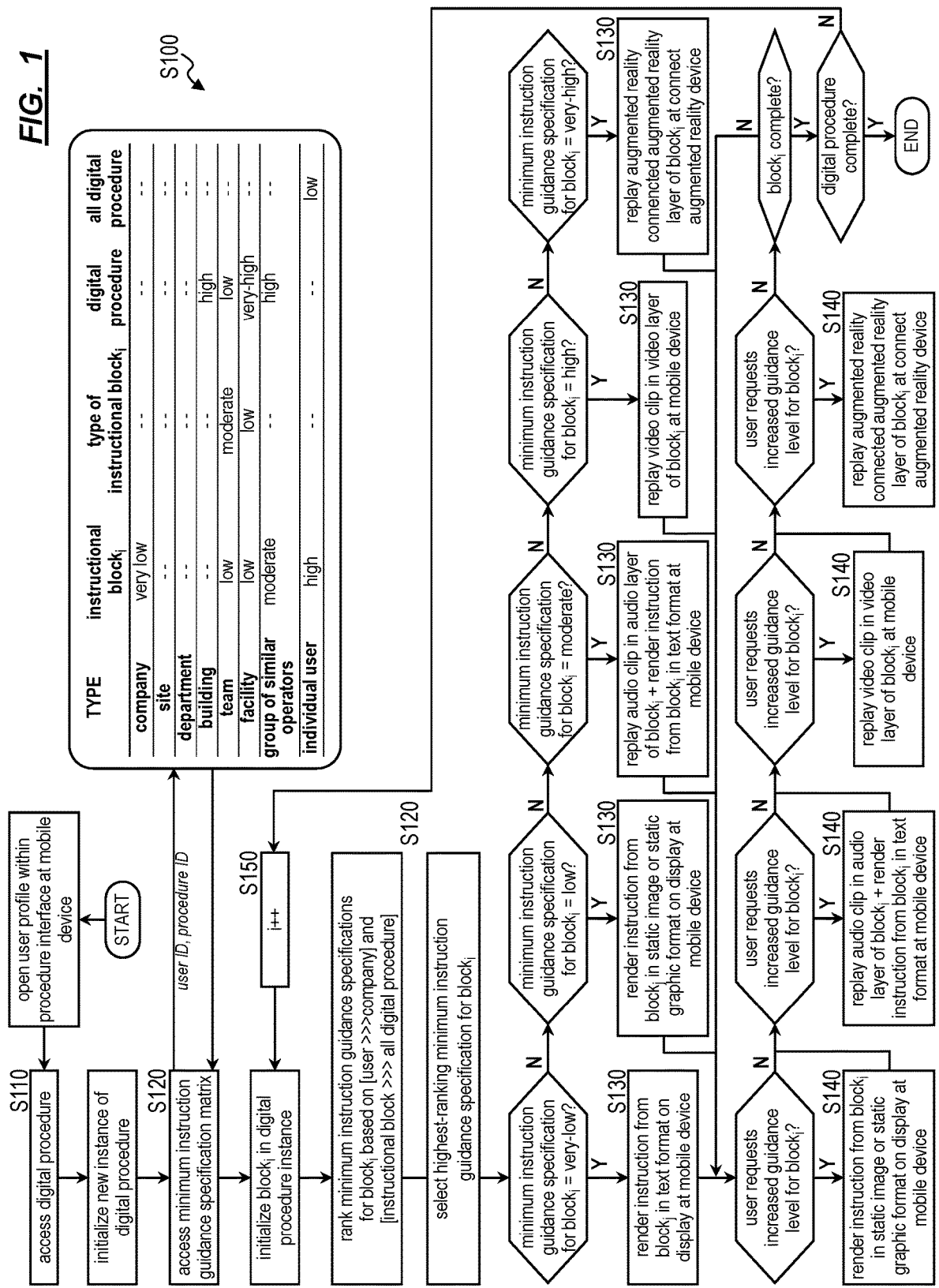
FIG. 1 is a flowchart representation of a method.

As shown in FIG. 1, a method S100 for controlling dissemination of instructional content to operators performing procedures at equipment within a facility includes, at a computing device associated with a user, accessing a digital procedure containing a first instructional block in Block S110, the first instructional block including a first instruction in a set of formats including: a text format corresponding to a first degree of guidance; an audio format corresponding to a second degree of guidance different from the first degree; and a visual format corresponding to a third degree of guidance greater than the first degree and the second degree. The method S100 further includes: accessing a minimum instruction guidance specification assigned to the user for a current instance of the digital procedure at the computing device in Block S120; in response to initiation of the first instructional block in the digital procedure, presenting the first instruction in a particular format, in the set of formats, corresponding to a particular degree of guidance approximating the minimum instruction guidance specification in Block S130; in response to selection of additional guidance for the first instruction, presenting the first instruction in a second format, in the set of formats, corresponding to a degree of guidance greater than the particular degree in Block S140; and, in response to completion of the first instructional block, initiating a second block in the digital procedure in Block S150.

2. Applications

Generally, a mobile device (such as a smartphone, tablet, augmented reality headset, or other computing device) can execute Blocks of the method S100 to serve guidance in targeted formats to a user while the user performs different steps (or "blocks") of a process at equipment within a facility in order to verify that the user has consumed a minimum degree of guidance necessary to perform these steps with a minimal likelihood of error. In particular, the mobile device can access a digital procedure that contains a sequence of blocks, wherein some or all of these blocks contain instructions for completing their specified tasks in multiple formats, such as: a text format; an audio format (e.g., an audio clip); a video format (e.g., a video clip); a prerecorded augmented reality overlay; or a responsive augmented reality overlay. The mobile device can also access a minimum instruction guidance specification—such as for a particular block or block type in the digital procedure or for the digital procedure as a whole—and then selectively serve instructions in each block in the digital procedure to the user according to the corresponding minimum instruction guidance specification(s) as the user performs this digital procedure. The mobile device can also enable the user to elect instructions in a format corresponding to a higher level of guidance than specified by the minimum instruction guidance specification for a particular block, thereby ensuring that the user has consumed a minimum degree of guidance for this block but also enabling the user to access more guidance in a format that better suits the user's needs or preferences.

For example, a computer system that manages and disseminates digital procedures within a facility can generate a new digital procedure, such as by: ingesting an electronic document for a new procedure; aggregating text extracted from this electronic document with audio and video data collected during the exemplary instance of this new procedure performed at a machine in the facility by a trained operator or supervisor; and then combining these text, audio, and visual data into a sequence of blocks for the new procedure, wherein each block contains instruction in one or more of a text format (e.g., low guidance), an audio format (e.g., moderate guidance), and a video format (e.g., high guidance). Because this digital procedure is new to the facility, the computer system can set minimum instruction guidance specifications at a maximum available guidance level for each block in the new digital procedure, including: instructions in text format for blocks that contain text-based instructions only; instructions in audio format (e.g., replayed through a speaker or headset with text-based instructions concurrently rendered on a display a user's mobile device) for blocks that contain audio-based instructions but not video-based instructions; instructions in video format (e.g., rendered on a display in a user's mobile device or replayed by an augmented reality headset) for blocks that contain video-based instructions; and 3D, holographic, haptic, and/or other media format types. When this new procedure is disseminated to mobile devices carried by users (e.g., operators, technicians) in the facility, these mobile devices can implement Blocks of the method S100 to serve instructions in each block in the new digital procedure to the user according to this minimum instruction guidance specification.

In another example, as users in the facility complete an increasing number of instances of this digital procedure, these users may become more familiar with this procedure and therefore continue to achieve low error rates despite lower levels of guidance (e.g., video to audio, audio to text). The computer system can therefore lower the minimum instruction guidance specification for this digital procedure over time as more instances of the digital procedure are completed with no or minimal errors (or "deviation events"). Similarly, as more instances of the digital procedure are completed over time, the computer system can: lower the minimum instruction guidance specifications for individual blocks in the digital procedure if error rates for these blocks remain low; while also maintaining high(er) minimum instruction guidance specifications for other blocks in the digital procedure if error rates for these blocks remain high or above a threshold. After lowering the minimum instruction guidance specification for the digital procedure as error rates drop or remain low, the computer system can also increase the minimum instruction guidance specification for the digital procedure if error rates begin to increase.

Additionally or alternatively, as more instances of the digital procedure are completed by multiple users in the facility over time, the computer system can: lower the minimum instruction guidance specifications for the digital procedure as a whole for users who exhibit low error rates when performing this digital procedure; and maintain high(er) minimum instruction guidance specifications for other users who exhibit high(er) error rates when performing this digital procedure. The computer system can similarly: adjust minimum instruction guidance specifications for a particular block within the digital procedure for an individual user based on error rates during recent instances of the digital procedure completed by this user; and set a minimum instruction guidance specification(s) for the digital procedure proportional to a duration of time since the user last completed this digital procedure. The computer system (or a user's mobile device) can also implement this process in real-time to achieve a minimum instruction guidance specification for an upcoming block in a current instance of the digital procedure based on the user's performance of preceding blocks in the current instance of the digital procedure.

Furthermore, the computer system can increase a minimum instruction guidance specification for a particular block in the digital procedure or for the digital procedure as a whole responsive to revision of this particular block. Thus, the computer system can adjust the minimum instruction guidance specification for the revised digital procedure to ensure that a user consumes more extensive guidance when completing this revised digital procedure, which may improve likelihood that the user is made aware of a change in the digital procedure and performs the digital procedure without error (e.g., rather than performing the digital procedure according to past habit, which may deviate from the revised digital procedure and thus result in an error or other deviation event).

Upon receipt of the digital procedure in preparation for supporting a user performing a process at a machine in the facility, the mobile device can thus access a current minimum instruction guidance specification for a particular block or for the digital procedure as a whole for the user, for a group of similar users, or for all users in the facility and then implement Blocks of the method S100 to selectively serve instructions in each block in the digital procedure to the user in formats specified in the minimum instruction guidance specification. Thus, the computer system and the mobile device can cooperate: to ensure that users with minimal experience in the facility or with a particular machine or digital procedure receive high levels of guidance in order to reduce opportunity for error (or "deviation") by these users; preempt errors (or "deviation events") by a particular user by serving guidance to this user in formats that have limited or reduced errors by similar users (e.g., age, experience, group inside the facility) in the past; increase efficiency and reduce frustration of users by reducing minimum instruction guidance specifications as these users gain experience and reduce error rates over time; and adjust a minimum instruction guidance specification for a current instance of the digital procedure based on user performance during preceding blocks in this current instance of the digital procedure in order to (re)train the user in best practices for the digital procedure in real-time.

Furthermore, the computer system and mobile device can cooperate to execute these Blocks of the method S100 in order to transform paper-based procedures into digital procedures and to augment blocks in these digital procedures with instructions in multiple formats as these digital procedures are completed by operators in the facility over time, thereby streamlining transition from paper-based to digital procedures while also ensuring that good manufacturing practices (or "GMPs") are observed by operators performing these digital procedures and automatically maintaining an audit trail and revision history for these digital procedures.

The method S100 is described herein as executed within a pharmaceutical production facility (hereinafter the "facility") to support a spectrum (or "matrix") of data collection and automated procedural guidance options for users (e.g., operators, technicians) performing testing and operating procedures on biotechnical and/or pharmaceutical production equipment (hereinafter "machines" and "support equipment"). In particular, Blocks of the method S100 can be implemented by mobile devices to provide "just-in-time training"—at levels matched to probability of human error and/or perceived operator need—to operators performing procedures at non-networked (or "silo'd") machines and support equipment within a production facility in order to increase operator comprehension of steps in these procedures and thus reduce probability of human error. However, the method S100 can be implemented in a facility or environment of any other type.

3. System

Generally, Blocks of the method S100 can be executed by a system including: a computer system, such as a remote server or a computer network; and a mobile device, such as a wearable device, a smartphone, a tablet, an augmented reality headset connected to another device, or a standalone augmented reality headset. For example, the mobile device can be an augmented reality headset, including a heads-up display, eyes-up display, head-mounted display, or smart glasses configured to render augmented reality content for an operator wearing this a mobile device. Alternatively, the mobile device can include a Wi-Fi-enabled smartphone or tablet connected to a separate augmented reality device, such as an wearable device removably attachable to the operator's coveralls, clean room gowning, and/or personal protective equipment, carried in a user's hand or worn on a lanyard on the user's neck. Alternatively, a fixed and/or persistently monitoring devices within the workspace can be deployed to support the operators performing procedures.

Furthermore, the mobile device can include: a suite of sensors configured to collect information about the mobile device's environment; local memory and/or cloud memory configured to temporarily store a localization map of a room; a display; a speaker or audio jack; and a controller configured to determine a location of the mobile device in real space, such as based on the localization map and data collected by the suite of sensors. For example, the mobile device can include: a depth camera paired with a 2D color camera; or a pair of stereoscopic 2D color cameras. Each of these optical sensors can output a video feed containing a sequence of digital photographic images (or "frames"), such as at a rate of 20 Hz, and the controller can compile concurrent frames output by these optical sensors into a 3D point cloud or other representation of surfaces or features in the field of view of the mobile device. Following receipt of a localization map of a room occupied by the mobile device and generation of a 3D point cloud (or other representation of surfaces or features in the field of view of the mobile device), the controller can implement point-to-plane fitting or other techniques to calculate a transform that maps the 3D point cloud onto the localization map in order to determine the pose of the mobile device within the room.

However, the mobile device can include any other type of sensor in any other quantity and can implement any other method or technique to calculate its pose within a room based on a localization map of the room and data recorded by these sensors.

4. Generating the Digital Procedure

Figure 3:
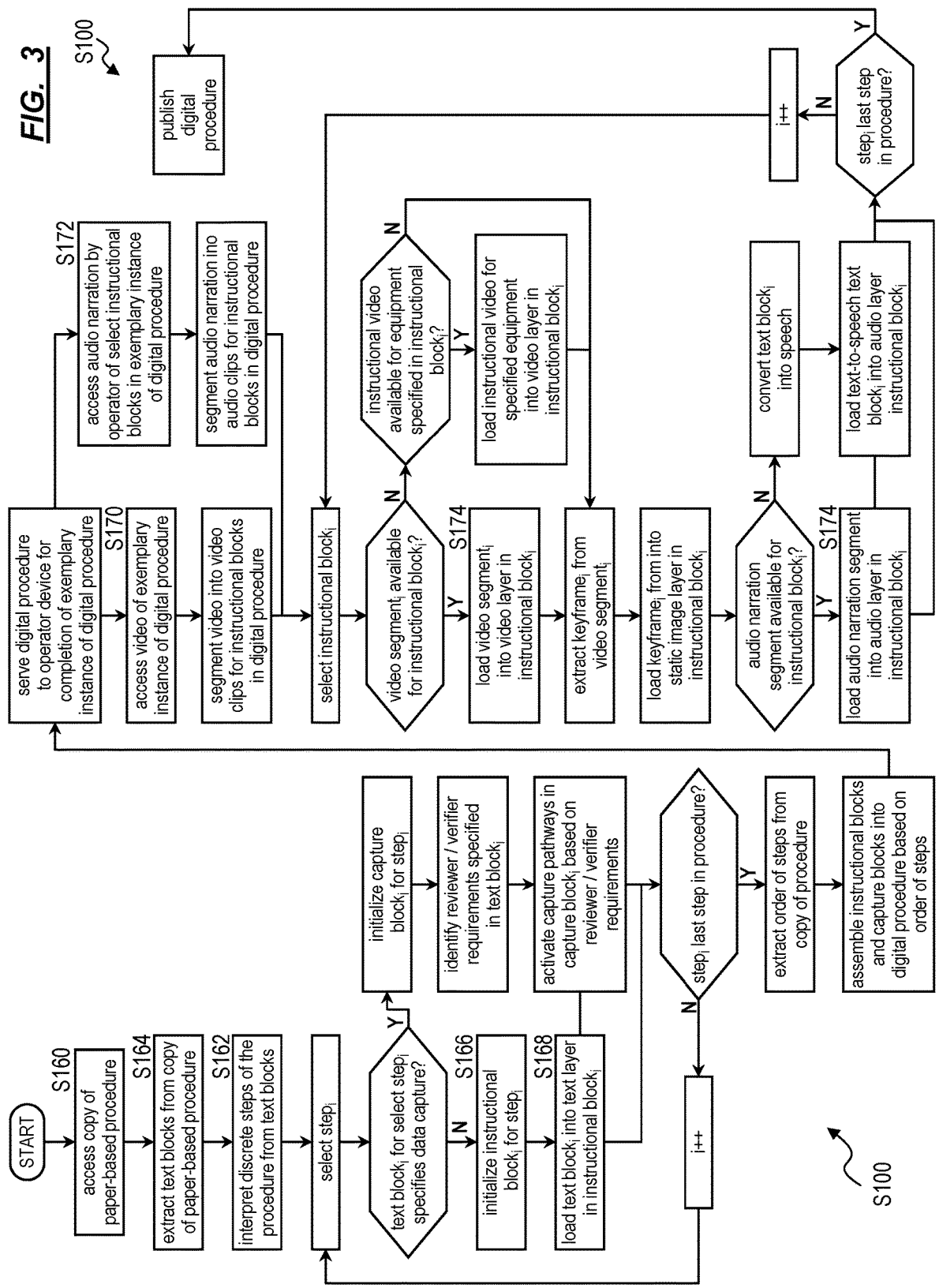
FIG. 3 is a flowchart representation of one variation of the method.

In one variation shown in FIG. 3, the method S100 includes: at the computer system, accessing an electronic document for a procedure in a facility in Block S160; and identifying a sequence of steps specified in the electronic document in Block S162. This variation of the method S100 also includes, for each step in the sequence of steps: extracting an instruction in the text format, corresponding to a first degree of guidance, for the step in Block S164; initializing a block, in a set of blocks, for the step in Block S166; and populating the block with the instruction in the text format for the step in Block S168. This variation of the method S100 further includes, for a first step, in the sequence of steps, including a first instruction in the text format: accessing the first instruction depicted in a second format corresponding to a second degree of guidance different from the first degree in Block S170; and accessing the first instruction depicted in a third format corresponding to a third degree of guidance greater than the first degree and the second degree in Block S172. Furthermore, this variation of the method S100 includes: compiling the set of blocks into the digital procedure according to an order of the sequence of steps defined in the electronic document; appending a first block, in the digital procedure, corresponding to the first step with the first instruction depicted in the second format and the first instruction depicted in the third format in Block S174; setting a minimum instruction guidance specification, defining a minimum degree of guidance for the first instruction, for the first block; and serving the digital procedure to a mobile device for presentation of instructions in the set of blocks to a user, in the facility, in formats specified by a minimum instruction guidance specification in Block S180.

Generally, in this variation, the computer system can: ingest a paper-based procedure; identify steps in the paper-based procedure; extract instructions (e.g., text-based instructions) for steps in the paper-based procedure; aggregate other supportive content for these steps, such as in the form of images, audio, video, or augmented reality content; compile these data into individual instructional blocks containing instructions in different formats corresponding to different levels of human-targeted guidance; and then order these individual blocks or define a pathway for these individual blocks (in a decision tree) to generate a new digital procedure. Upon receipt of this digital procedure, a mobile device can execute Blocks of the method S100 to serve instructions in each block in the digital procedure to a user in select formats according to a current minimum instruction guidance specification for the digital procedure, assigned the individual user, or assigned globally to all users in the facility.

4.1 Text Format

In one implementation, an administrator affiliated with the facility loads an existing paper copy of a document outlining steps of a procedure for a machine in the facility into an administrator portal—hosted by the system—to create a digital form of this procedure. For example, the administrator can scan the paper copy of the document with a smartphone, tablet, or dedicated scanner; alternatively, the administrator can directly access a digital (e.g., vectorized, digitized) copy of this document.

The administrator portal can then interface with the administrator to: highlight a procedure identifier in the copy of the document, such as a QR code, barcode, alphanumeric procedure identifier and revision number, or textual description of the procedure; and link this procedure identifier to a particular machine, type or class of machine, or configuration of machine in the facility and/or to a particular location, room, or area inside the facility. For example, the administrator can select each machine, machine type or class, or machine configuration from a dropdown menu—rendered in the administrator portal—of all machines in the facility and/or select a machine or location within the facility from a map (e.g., a plan map, or a 3D localization map) of the facility—rendered in the administrator portal—to link to this procedure identifier. The administrator portal can similarly interface with the administrator to link support equipment, such as a scale, to this procedure identifier.

The computer system can then implement text recognition, natural language processing, or other textual analysis or computer vision techniques to: detect breaks or textual indicators between consecutive steps in the process outlined in the document; extract textual descriptions and textual instructions for each of these steps; and distinguish instructional steps from data capture steps in this process based on these textual descriptions and/or instructions.

The computer system can then initialize one instructional block per instructional step thus identified in this process. For example, a generic instructional block can include multiple instructional layers, wherein each instructional layer is configured to store instructional content in one format, such as: text; audio; images or graphics (e.g., static images); video; prerecorded augmented reality content; responsive augmented reality content; and prerecorded or localized 3D content. For each instructional step thus identified in this process, the computer system can populate a first text layer in the corresponding instructional block with the textual description and/or textual instruction extracted from the corresponding step in the document outlining the process.

4.2 Audio Format

For each instructional step thus identified in this process, the computer system can also populate a second audio layer in the corresponding instructional block with an audio clip describing the corresponding step in the process.

In one example, for a particular instructional block in the digital procedure, the computer system can: implement text-to-speed methods to transform a text-based instruction—in the instructional block—into an audio clip of an automated voice reciting the text-based instruction; and then store this audio clip (i.e., the instruction in the audio format) in the audio layer of the particular instructional block. The computer system can repeat this process to automatically generate audio clips for other instructional blocks describing steps in the process.

Additionally or alternatively, the computer system can: interface with the administrator—via the administrator portal—to record audio clips of the administrator reciting instructional content related to these instructional blocks; and then store these audio clips in audio layers of the corresponding instructional blocks. However, the computer system can implement any other method or technique to access or generate audio content for audio layers in instructional blocks thus generated for this process.

4.3 Visual Format

The computer system can implement similar methods and techniques to extract graphics or other static visual content from the document outlining the procedure and/or access static visual content selected or uploaded by the administrator via the administrator portal. The computer system can then store this visual content in static visual content layers in corresponding instructional blocks for this process.

4.4 Video Format

The computer system can also populate video layers in all or select instructional blocks with video content (or "video clips").

In one implementation, after initializing the digital procedure with instructional blocks containing low-level guidance content extracted from the paper document outlining the procedure (and after inserting capture blocks into the digital procedure, etc. as described below), the computer system can serve the digital procedure to a mobile device associated with the administrator or other well-trained operator in the facility for completion of an initial (or "exemplary") instance of the new digital procedure. While the administrator or operator performs this first instance of the new digital procedure at a machine in the facility, the mobile device can record a video of this initial instance of the digital procedure, timestamp frames in this video, and tag these frames or video snippets with identifiers of concurrent instructional blocks in the digital procedure. The computer system can then: segment the video of this initial instance of the digital procedure into a set of video clips—each corresponding to one instructional block—based on these tags; and then load a video clip into the video layer in a corresponding instructional block in the digital procedure for all or a subset of these instructional blocks.

In another implementation, the computer system can interface with the administrator via the administrator portal to access prerecorded instructional videos for machines and equipment specified in the document and load these videos directly into video layers in corresponding instructional blocks in the digital procedure. Additionally or alternatively, the computer system can: implement natural language processing or other techniques to isolate words or phrases corresponding to equipment or specific processes specified within a step in the document; automatically retrieve video content related to these words or phrases; and then load this video content directly into a video layer of the corresponding instructional block in the digital procedure. For example, the computer system can detect a make and model number of a particular machine specified in a step in the process, search a database for a video described basic operation of this make and model number of the machine, and then download or link this video to the video layer in the corresponding instructional block. In this example, the computer system can also isolate a particular action at this make and model number of machine (e.g., "tare scale model X by manufacturer Y"), retrieve a video depicting this particular action at this make and model number of machine (e.g., a video entitled "how to tare scale model X by manufacturer Y"), and then download or link this video to the video layer in the corresponding instructional block.

The computer system can: implement similar methods and techniques to retrieve diagrams (i.e., static image or graphics) for particular equipment or equipment-specific action specified in steps outlined in the document; and then store these diagrams in static image layers in corresponding instructional blocks in the digital procedure. Additionally or alternatively, the computer system can implement similar methods and techniques to retrieve video clips describing operation or actions at particular equipment or equipment-specific action specified in steps outlined in the document; extract audio snippets from these video clips (or from video segments recorded during the initial instance of the digital procedure); and then store these audio snippets in audio layers in corresponding instructional blocks in the digital procedure. The computer system can implement similar methods and techniques to generate augmented reality overlays for instructional blocks from video recorded during the initial instance of the digital procedure, load augmented reality overlay content supplied by the administrator via the administrator portal, and/or retrieve augmented reality overlay data from an external database and then store these augmented reality overlay content in augmented reality layers in corresponding instructional blocks in the digital procedure.

The computer system can also: access audio and/or visual data collected during subsequent instances of the digital procedure by the same operator or other users in the facility over time; extract audio, video, augmented reality, or other visual content from these audio and/or visual data; and update layers in instructional blocks in the digital procedure based on these new data.

4.5 Capture Blocks

The computer system can also generate one capture block per capture step in the process. For example, a capture block can similarly includes multiple capture layers, wherein each capture layer is configured to record data in one format or through one pathway, such as: manually-entered text; manually-entered numerical data; an image; a video; text or numerical data extracted automatically from an image or video feed recorded by a user's mobile device; etc.

In one implementation, the computer system interfaces with the administrator via the administrator portal to specify data input regions in this digital copy of the document. For example, the administrator can highlight input fields specifying manual record keeping in the document, such as a line or box for recording a weight, pressure, temperature, density, or composition value read from a scale or dial on a machine or for recording a textual note. The administrator can then link each region of interest in the document to a primary data type or data class, such as manual text or numerical entry, manual audio or visual capture, or automated audio or visual capture. The administrator can also specify secondary and/or tertiary capture for a particular capture block, such as manual numerical entry as a primary data type augmented with automated video capture and automated numerical value extraction from captured video to verify manual numerical entry. The computer system can define and selectively enable layers in each capture block in this digital procedure according to such input from the administrator.

4.6 Digital Procedure Assembly

The computer system can similarly retrieve blocks of other types—such as described below—and populate these blocks with data extracted from the document and/or with data entered by the administrator. The computer system can then order these blocks according to the sequence of steps outlined in the document and assemble these blocks into one new digital procedure accordingly.

However, the computer system can implement any other method or technique to generate a digital procedure.

4.7 Instructional Block Formats

Therefore, the computer system can aggregate instruction data in different formats—such as in textual, static image or graphical, audio, video, prerecorded augmented reality, and/or responsive augmented reality formats—for each instructional block in the digital procedure. The computer system can also assign a guidance value to each instruction format in an instructional block.

In one implementation, the computer system implements a preset guidance scale in which instruction formats are ranked, in increasing order of guidance level, from textual format to graphical format, then audio format, static image format, video format, prerecorded augmented reality format, and/or finally responsive augmented reality format.

For example, the digital procedure can contain a sequence of instructional blocks including the first instructional block describing a first instruction in the set of formats including: a text format including a textual description of a first process step in the digital procedure (e.g., extracted directly from the paper-based document outlining the procedure) and characterized by a first degree of guidance; an audio format including an audio recording of a (real or automated) voice describing the first process step and characterized by a second degree of guidance greater than the first degree; a visual format including a video clip depicting performance of the first process step (e.g., recorded during an "exemplary" instance of the digital procedure or including a technical manufacturer's video describing operation of its equipment) and characterized by a third degree of guidance greater than the second degree; and an augmented reality overlay (generated based on manual augmentation of a video of an "exemplary" instance of the digital procedure) corresponding to a fourth degree of guidance greater than the third degree; etc.

Alternatively, the administrator can manually label guidance levels for each format in an instructional block, and the computer system can rank or sort these instruction formats within an instructional block accordingly.

5. Loading Digital Procedure

Block S110 of the method S100 recites, at a mobile device associated with a user, accessing a digital procedure containing a first instructional block, the first instructional block including a first instruction in a set of formats including: a text format corresponding to a first degree of guidance; an audio format corresponding to a second degree of guidance different from the first degree; and a visual format corresponding to a third degree of guidance greater than the first degree and the second degree. Generally, in Block S110, a mobile device assigned to or carried by a user can access a digital procedure in preparation for the user performing a next instance of the digital procedure.

In one implementation, a user's mobile device automatically initializes a new instance of a digital procedure based on proximity of the mobile device to a machine, equipment, or location scheduled for the corresponding procedure. In this implementation, the mobile device can track its location and orientation within the facility. As the user approaches the machine in preparation for performing this procedure, the mobile device—worn or carried by the user—can track its location within the facility and identify a particular machine with which the user is interfacing based on this location. For example, the mobile device can: determine that the mobile device is occupying a particular campus based on the mobile device's current geospatial (e.g., GPS) coordinates; determine the building, floor, and/or room that the mobile device is occupying based on wireless (e.g., Wi-Fi) connectivity in the space occupied by the mobile device; and then compare features detected in images recorded by a camera on the mobile device to a 2D or 3D localization map of the building, floor, and/or room in the facility in order to determine the position and orientation of the mobile device in real space. In this example, the mobile device (or a computer system) can then query a map of machines throughout the facility for a particular machine adjacent and facing the mobile device—and therefore the user—based on the position and orientation of the mobile device in real space. Alternatively, the mobile device can identify the particular machine directly by matching a constellation of features detected in images recorded by the camera to a known, unique constellation of features associated with this particular machine.

The mobile device can regularly execute this process to monitor its position and orientation within the facility and detect machines nearby. Then, when the user stops for more than a threshold duration of time (e.g., ten seconds) or when the mobile device determines that its location has moved less than a threshold distance within a period of time (e.g., one meter in ten seconds), the mobile device can: query the digital procedure database for a digital procedure associated with a machine nearest the current position of the mobile device; and automatically load an instance of this digital procedure for this machine, such as if this annotator portal is scheduled for completion within a current time window.

In a similar implementation, the mobile device can: rank machines in the facility by proximity to the current location of the mobile device; render a list of these machines ordered by their rank on a display of the mobile device; prompt the user to select from the list; and download an instance of a particular digital procedure associated with a machine selected by the user. For example, in Block Silo, the mobile device can: track its location within the facility; detect a set of machines nearby based on a map of the facility and the location of the mobile device within the facility; retrieve a list of digital procedures associated with this set of machines; render this list of digital procedures on a display of the mobile device; download a particular digital procedure from a database (e.g., a remote server via a wireless network) in response to the user selecting this particular digital procedure from the list of digital procedures; and then initialize a new, local instance of the particular digital procedure accordingly at the mobile device.

Alternatively, the user can manually select (or "pull") the particular machine directly from a dropdown list of machines or select the particular digital procedure directly from a dropdown list of digital procedures for all machines and equipment in the facility. The mobile device can then initialize a new, local instance of this digital procedure selected manually by the user.

However, the mobile device can implement any other method or technique to access a digital procedure and initialize a new, local instance of the digital procedure.

6. Minimum Instruction Guidance Specification

Block S120 of the method S100 recites accessing a minimum instruction guidance specification assigned to the user for a current instance of the digital procedure at the mobile device. Generally, in Block S120, the mobile device can retrieve a minimum instruction guidance specification for a particular instructional block in the digital procedure, a particular type of instructional block in the instructional block, or the digital procedure as a whole.

In one implementation, the computer system implements methods and techniques described below to set minimum instruction guidance specifications: specifically for the user currently carrying the mobile device; for a group of similar users in the facility; and/or for all operators within the same team, group, building, facility, department, site, company, or regulated environment. The computer system can store these minimum instruction guidance specifications—linked to individual user, team, group, building, facility, department, site, and/or company identifiers—in a remote database. The computer system can also regularly update these minimum instruction guidance specifications based on results of digital procedures completed by these operators and/or responsive to digital procedure revisions.

Thus, when the user's mobile device initializes a new, local instance of a digital procedure in Block S110, the mobile device can also return a query for current minimum instruction guidance specification for this instance of the digital procedure—to the computer system or remote database—based on the user's identifier and the digital procedure in Block S120. The mobile device can then implement the minimum instruction guidance specification(s) returned by the computer system or remote database to selectively serve instructions to the user in formats that fulfill the minimum instruction guidance specification(s) during execution of this current instance of the digital procedure.

7. Default Instruction Format

Block S130 of the method S100 recites, in response to initiation of the first instructional block in the digital procedure, presenting the first instruction in a particular format, in the set of formats, corresponding to a particular degree of guidance approximating the minimum instruction guidance specification. Generally, when the user enters an instructional block in the current instance of the digital procedure at the mobile device, the mobile device can: access a minimum instruction guidance specification for this block and for this user in Block S120; identify a particular instruction format—in a set of instruction formats contained in layers in this block—that fulfills this minimum instruction guidance specification; and then present the instruction for this block in the particular instruction format to the user via a display or speaker in the mobile device or in a connected device, as shown in FIG. 1.

The method S100 also includes Block S140, which recites presenting the first instruction in a second format, in the set of formats, corresponding to a degree of guidance greater than the particular degree in response to selection of additional guidance for the first instruction. Generally, in Block S140, the mobile device can serve instructional content— corresponding to higher levels of guidance than specified in the minimum instruction guidance specification—to the user during the current instructional block in the digital procedure responsive to inputs from the user.

In one implementation, the computer system defines a minimum instruction guidance specification in the form of a particular instruction format, such as one of: text; static images or graphics; audio; video; prerecorded augmented reality; or responsive augmented reality. For example, if the computer system previously set a minimum instruction guidance specification of "audio format" for the current instructional block in the current instance of the digital procedure performed by the user, the mobile device can serve the instruction for this instructional block to the user in the audio format by default. In Block S140 described below, the mobile device can then enable the user to elect other instruction formats corresponding to higher guidance levels, including: enabling the user to elect the video, prerecorded augmented reality, and/or responsive augmented reality formats in place of the audio format; and preventing the user from accessing the text, static image, and static graphic formats exclusive of the audio format. In this example, the mobile device can also enable the user to access the text, static image, and/or static graphic formats for this instructional block only if the audio format is also replayed, such as: during replay of the audio clip for this instructional block; or only after this audio clip is replayed in its entirety. For example, the mobile device can automatically render the instruction for the current instructional block in the text, static image, and/or static graphic formats on its integrated display or enable the user to index between these lower-guidance formats while the mobile device serves the instruction for the current instructional block in the audio format (e.g., by replaying the audio clip for this instructional block).

In a similar example, if the computer system previously set a minimum instruction guidance specification of "video format" for the current instructional block in the current instance of the digital procedure performed by the user, the mobile device can serve the instruction for this instructional block to the user in the video format by default. In Block S140 described below, the mobile device can then enable the user to elect other instruction formats corresponding to higher guidance levels, including: enabling the user to elect the prerecorded augmented reality and/or responsive augmented reality formats in place of the video format; and preventing the user from accessing the text, static image, static graphic formats, and audio format exclusive of the video format. In this example, the mobile device can also enable the user to: access the text, static image, and/or static graphic formats for this instructional block after the mobile device has fully replayed a video clip in the current instructional block; or open these lower-guidance instruction formats in real-time during replay of this video clip.

Therefore, in the foregoing example, the computer system can set a minimum instruction guidance specification defining a particular degree of guidance corresponding to an audio format for an instructional block in the current instance of the digital procedure. The mobile device can then play back an audio recording in this instructional block by default according to the minimum instruction guidance specification in response to initiation of the instructional block in the current instance of the digital procedure. During playback of the audio recording, the mobile device can also enable selection of further guidance for the instruction from the user; responsive to selection of further guidance for the first instruction, the mobile device can then play back a video clip for the instructional block. If the user again elects further guidance for the instruction, the mobile device can then render an augmented reality overlay—aligned to features on a machine proximal the user—on a display of the mobile device or serve this augmented reality overlay to an eyes-up display worn by the user.

In another implementation, the computer system defines a minimum instruction guidance specification in the form of a quantitative or qualitative value, such as: on a scale from 0 to 100; or according to very low, low, moderate, high, and very high guidance descriptors. In this implementation, the computer system can also interface with an administrator to ascribe quantitative or qualitative guidance values to layers in instructional blocks in a digital procedure. For example, for a first instructional block describing taring a scale, the computer system can record moderate (or "68/100") guidance for instruction in a text format, high guidance (or "84/100") for instruction in a static graphic format, and very high guidance (or ">92/100") for instruction in audio, video, and augmented reality formats. In this example, for a second instructional block describing a time-sensitive sequence of steps for mixing compounds of carefully-controlled amounts at a machine, the computer system can record very low guidance (or "25/100") for instruction in a text format, low guidance (or "37/100") for instruction in a static graphic format, and moderate guidance (or "55/100") for instruction in an audio format, high guidance (or "81/100") for instruction in a video format, and very high guidance (or ">90/100") for instruction in an augmented reality format. In this example, if the computer system assigns a "moderate" minimum instruction guidance specification to the user for the current instance of the digital procedure, the mobile device can present instruction in the first instructional block to the user in the text format and present instruction in the second instructional block to the user in the audio format. Alternatively, if the computer system assigns a minimum instruction guidance specification of "60/100" to the user for the current instance of the digital procedure, the mobile device can present instruction in the first instructional block to the user in the text format and present instruction in the second instructional block to the user in the video format in Block S130. The mobile device can then enable the user to elect instructional formats corresponding to higher levels of quantitative or quantitative guidance in Block S140.

7.1 Manual Selection v. Minimum Instruction Guidance Specification

In one variation, the mobile device (or the computer system) can: track request for higher-guidance instruction format entered by the user over time, such as during previous blocks in the current instance of the digital procedure, during previous instances of the same digital procedure, or during previous instances of any other digital procedure in the facility; and predict the user's preferences for formats for consuming instructions within instructional blocks. The mobile device can then: selectively serve instructions in instructional blocks in the current instance of the digital procedure to the user in the user's preferred format if this preferred format corresponds to a level of guidance greater than or equal to the minimum instruction guidance specification for this instructional block, for this digital procedure, or for this user; and otherwise serve these instructions in formats specified by the minimum instruction guidance specification.

For example, the mobile device can record a user-elected format, in a set of formats supported within a particular instructional block, selected by the user when viewing the particular instructional block during the current instance of the digital procedure. During a next instance of the digital procedure at the mobile device, the mobile device can access an updated minimum instruction guidance specification assigned to the user—by the computer system, as described below—for this next instance of the digital procedure. In response to initiation of the particular instructional block during this next instance of the digital procedure, the mobile device can: present the instruction in the particular instructional block in a format corresponding to a degree of guidance specified in the updated minimum instruction guidance specification if the user-elected format corresponds to a degree of guidance less than the updated minimum instruction guidance specification; or present the instruction in the particular instructional block in the user-elected format if the user-elected format corresponds to a degree of guidance greater than the updated minimum instruction guidance specification.

The mobile device can implement similar methods and techniques to feed guidance or instruction format selections made by the user forward to next instructional blocks in the same instance of the digital procedure. The mobile device can also implement guidance or instruction format preferences set manually by the user, such as in a user profile, and then implement similar methods and techniques to selectively serve instructions in user-preferred formats if these formats meet or exceed the minimum instruction guidance specification assigned to the user.

8. Next Block

Block S150 of the method S100 recites initiating a second block in the digital procedure in response to completion of the first instructional block. Generally, in Block S150, the mobile device can initiate a next block in the digital procedure—such as a next instructional block or a capture block—upon completion of the preceding instructional block in the digital procedure. For example, the mobile device can complete a first instructional block in the digital procedure and initiate a second block in the digital procedure in response to: completion of an audio, video, or augmented reality clip in the first instructional block; manual confirmation from the user to move to the next block; manual entry or automatic capture of a value instructed in the first instructional block; or a change in location or orientation of the mobile device that indicates completion of the first instructional block. The mobile device can then repeat the foregoing methods and techniques to serve instructions in the next instructional block to the user according to a minimum instruction guidance specification or implement methods and techniques described below to guide the user through a capture block.

(Furthermore, to move to a next block in the digital procedure, the user may confirm that the current block in the digital procedure is completed. While the mobile device can enable the user to repeat the current block of the digital procedure, the mobile device can also store timestamped information captured during the first instance of the current step in an audit-trail log and can prioritize data captured during a most-recent version of the current step—completed by the user during this instance of the digital procedure—in the audit-trail log. Additionally, the next instructional block can be linked to another module in the same or other digital procedure. In one example, in which the user drops a filter and in which this error is linked to a secondary module in the same digital procedure, the mobile device can serve a standard sequence of blocks—excluding this secondary model—in this digital procedure to the user by default but then selectively serve blocks in the secondary module to the user only in instances in which the user indicate manually that she dropped the filter or in which the mobile device automatically detected the dropped filter.)

9. Capture Block

In one variation shown in FIG. 3, the mobile device implements similar methods and techniques to enforce pathways for capturing data in capture blocks within the digital procedure.

In one implementation, the computer system initializes a capture block for recordation of data and incorporates this capture block in a digital procedure based on steps in a process outlined in a paper document, as described above. For example, the capture block can define a set of layers for data capture, including: manual numerical entry; manual text entry; manual selection from a prepopulated list of values; manual image capture at the mobile device; manual video capture; automatic image capture; automatic video capture; and automatic value (e.g., numerical value) capture from a static image or video stream. The computer system can thus interface with an administrator to selectively enable these data capture layers in the capture block. Alternatively, the computer system can automatically enable these data capture layers in the capture block based on data verification or validation requirements outlined in the document. For example, the computer system can specify both manual data entry and automatic data capture (e.g., an image or video) with automatic data extraction (e.g., extraction of a numerical value from an image or video) for a step designating supervisor verification in the document. The computer system can store minimum types or combinations of these data capture pathways in a capture mode specification for the particular data capture block, for data capture blocks of this type, for the digital procedure, or for a particular user, etc. Later, when the mobile device initializes the current instance of the digital procedure and then initiates this data capture block, the mobile device can: access the capture mode specification assigned for the digital procedure; and then prompt the user to record data in select capture formats—in the set of capture formats enabled in the data capture block—based on this capture mode specification.

Additionally or alternatively, the computer system can implement methods and techniques described below to define a capture mode specification for the particular data capture based on historical results of digital procedures completed in the facility over time. For example, the computer system can define redundant data capture pathways for data capture blocks, including (in order of increasing automation and reduced operator autonomy): manual data entry with manual verification via a digital image of a machine or process recorded manually by a user; manual data entry with manual verification via a digital image of a machine or process recorded automatically by a mobile device; manual data entry with automatic verification via a digital image of a machine or process recorded manually by a user; manual data entry with automatic verification via a digital image of a machine or process recorded automatically by a mobile device; and automatic data extraction and verification via a sequence of digital images recorded automatically by a mobile device. Thus, for a data capture block that specifies input of a numerical value, the computer system can assign a capture mode specification that defines increased automation and reduced operator autonomy proportional to a rate of error in manual entry of numerical values by operators during past instances of digital procedures in the facility. During the current instance of this digital procedure, the mobile device can guide the user in capturing data according to this capture mode specification, such as by prompting the user to enter a numerical value, record an image or video, and/or point the mobile device toward a particular machine or equipment to enable the mobile device to automatically capture an image or video and extract data from this image or video accordingly.

The computer system can also update the capture mode specification for this capture block in the digital procedure over time. For example, the computer system can: access an historical record of instances of the digital procedure performed previously by the user; detect errors related to the capture block during instances of the digital procedure performed previously by the user based on the historical record; and then refine the capture mode specification for the user to specify a quantity of capture formats for the capture block in the current instance of the digital procedure proportional to a rate of errors related to the capture block during previous instances of the digital procedure performed by the user. The computer system can similarly revise the capture mode specification for this capture block based on results from instances of the digital procedure performed by other operators in the facility, such as including: specifying more manual and automated capture pathways for greater redundancy responsive to increased data capture or process errors, which may reduce longer-term error rates; specifying fewer manual and automated capture pathways for less redundancy responsive to low or decreased data capture or process errors; and specifying one manual and automated capture pathway only for no redundancy responsive to low or null rates of data capture or process errors in order to reduce digital procedure durations and increase operator autonomy.

Additionally or alternatively, an instructional block can include a capture component, and the computer system can implement similar methods and techniques to define both a minimum instruction guidance specification and a capture mode specification for this instructional block. The mobile device can then implement methods and techniques described above to enforce both the minimum instruction guidance specification and the capture mode specification during this instructional block in a next instance of the digital procedure performed by a user.

10. Setting Minimum Instruction Guidance Specification

Figure 2A:
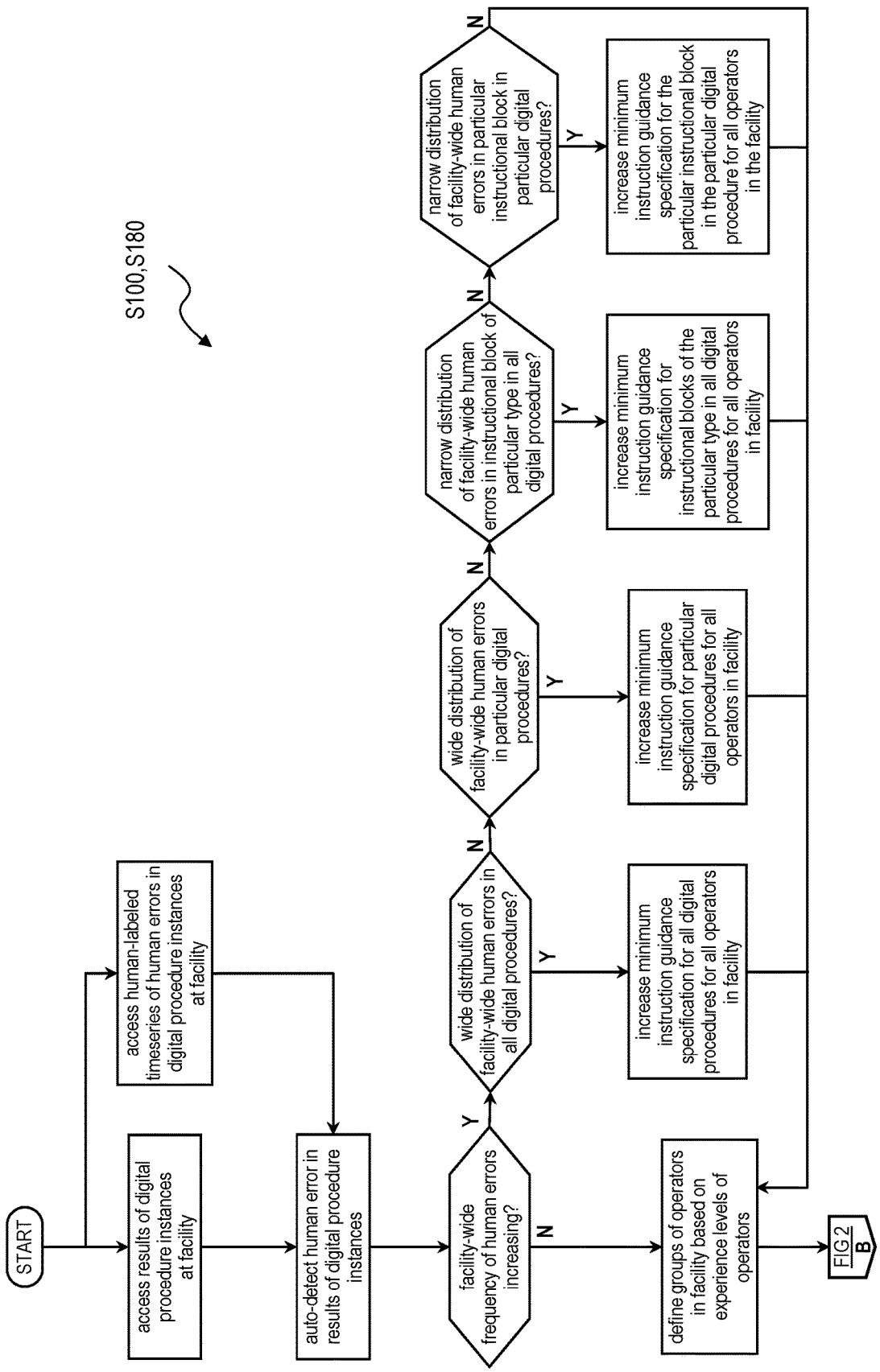
FIG. 2 is a flowchart representation of one variation of the method.
Figure 2B:
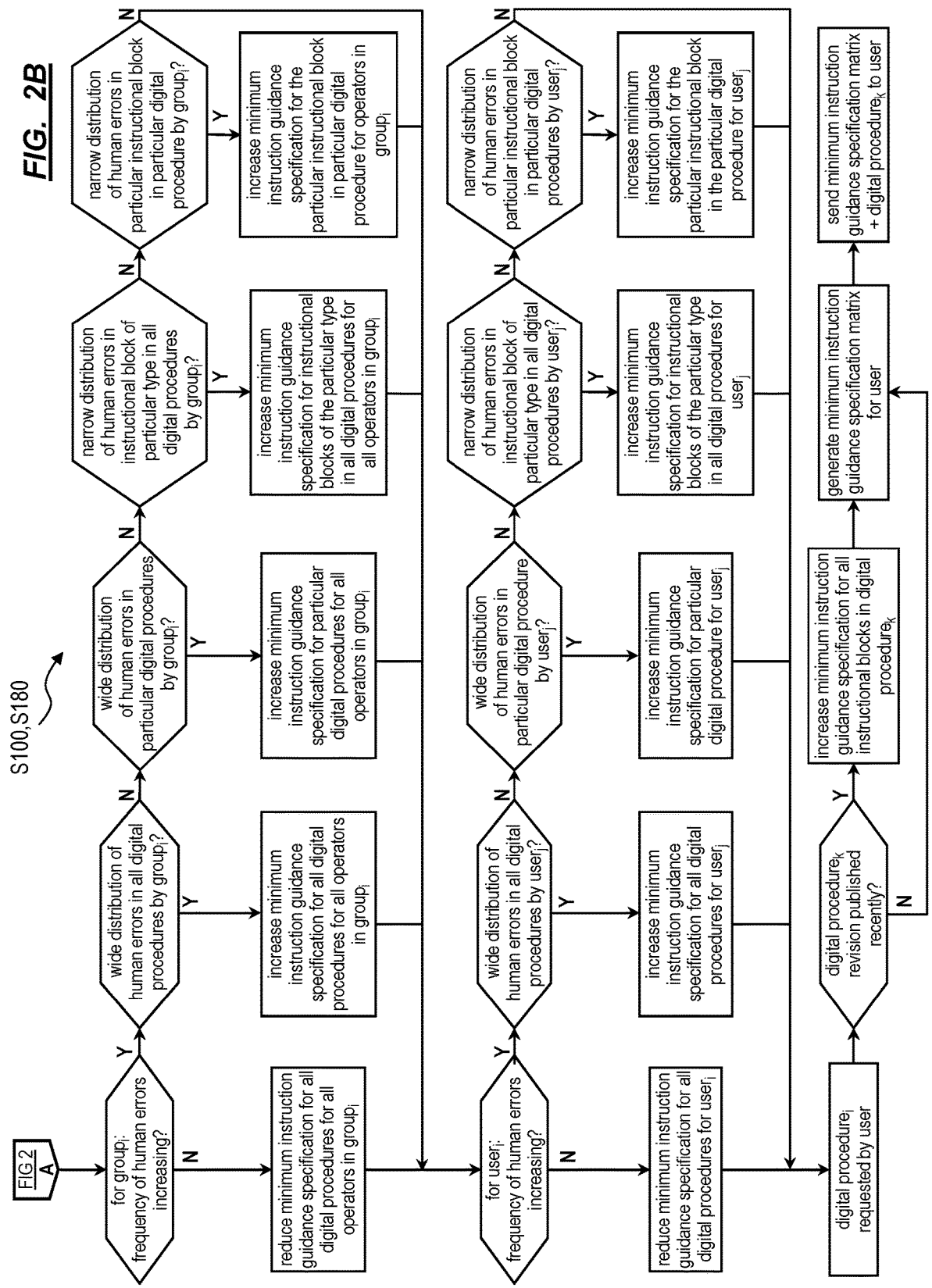

One variation of the method S100 shown in FIG. 2 includes Block S180, which recites setting a minimum instruction guidance specification—which defines a minimum degree of guidance—for an instruction in an instructional block in a digital procedure. Generally, in Block 122, the computer system (or the mobile device) can set a minimum level of guidance for an instructional block or select a particular instruction format for an instruction in an instructional block in a digital procedure in order to: reduce probability of error resulting from incomplete comprehension or misunderstanding of this instruction; while also preserving operator autonomy (e.g., by enabling operators to consume instructions according to their preferences or habits as long as a minimum instruction guidance specification is met); and while maintaining digital procedure efficiency (e.g., by enabling instructions to be served in less-invasive formats, such as text rather than a video, when probability of error is low).

For example, the computer system (or the mobile device) can: access individual user data, facility-wide operator data, and/or historical results of digital procedure instances previously completed in the facility; identify or access human errors in an instructional block in these previous instances of the digital procedure; increase minimum instruction guidance specification for the instructional block in the digital procedure if the rate of human error in this instructional block is high or increasing in order to ensure that operators performing this instructional block in future instances of the digital procedure receive more training (or "just-in-time training") for this instructional block, which may improve comprehension of a step or process outlined in the instructional block and reduce human error during these future instances of the instructional block. The computer system (or the mobile device) can define this minimum instruction guidance specification for this instructional block for all operators in a company, at a site, within a department, within a building, within a team or group, or within a set of similar operators based on historical results of digital procedures previously completed by these operators. The computer system can additionally or alternatively define this minimum instruction guidance specification for this instructional block for an individual user. Additionally or alternatively, the computer system can implement this process to define a minimum instruction guidance specification for a particular instructional block, for instructional blocks of a particular type within one or multiple digital procedures, for a digital procedure as a whole, or for all digital procedures deployed to the facility.

Conversely, a mobile device subsequently executing an instance of this digital procedure with a user can define a maximum instruction guidance specification—for the digital procedure as a whole—limited by a type or configuration of the mobile device, such as: text, static image, and static graphic formats for a standalone smartwatch; text, static image, static graphic, and audio formats for a smartwatch connected to an audio headset; text, static image, static graphic, audio, and video formats for a smartphone; text, static image, static graphic, audio, video, and prerecorded augmented reality formats for a tablet; and text, static image, static graphic, audio, video, prerecorded augmented reality, and responsive augmented reality formats for an augmented reality headset with a heads-up or eyes-up display. The mobile device can therefore serve instructions to the user in formats that fulfill current minimum instruction guidance specifications and that are supported by the mobile device. (Furthermore, prior to initiating a next instance of a digital procedure, the mobile device can verify that it supports all formats specified by current minimum instruction guidance specification for all instructional blocks in the digital procedure and, if not, prompt the user to retrieve a different mobile device.)

10.1 Human Error Data

As shown in FIG. 2, when setting or modifying a minimum instruction guidance specification, the computer system (or the mobile device) can access historical digital procedure result data in the form of human error records annotated with operator identifiers, dates and times, digital procedure identifiers and revisions, instructional block identifiers, locations, equipment identifiers, etc. For example, a supervisor reviewing results of digital procedures completed by staff may identify a human error when reviewing a procedure log for a digital procedure completed by an operator and then write an operator identifier, a date and time of the digital procedure, digital procedure and revision identifiers, and an identifier of one or more instructional blocks leading up to this error to an error log.

Similarly, operators may directly flag instances of digital procedures with known errors in real-time while performing these digital procedures; mobile devices executing these digital procedures can then write characteristics of these errors (e.g., operator identifier, a date and time of the digital procedure and the error, digital procedure and revision identifiers, and an identifier of the instructional block served to the operator during or just prior to an error) to the error log.

Additionally or alternatively, the computer system can maintain a timeseries of computing device locations, orientations, and/or actions throughout completion of an exemplary instance of a digital procedure. During a new instance of the digital procedure at a mobile device, the mobile device can record locations, orientations, and/or actions of the mobile device. During or upon completion of the digital procedure, the computer system (or the mobile device) can compare the locations, orientations, and/or actions at the mobile device during this instance of the digital procedure to locations, orientations, and/or actions at the computing device during the exemplary instance in order to detect deviations from the exemplary instance. The computer system can then prompt a supervisor: to review data collected and/or operator performance around deviations that exceed a threshold magnitude; to flag periods of identified or possible human error; and to write characteristics of these flagged periods to the error log.

The computer system can thus link instances of human error to particular instructional blocks based on temporal proximity of these errors to when instructions from the instructional blocks were served to users (e.g., instructions served during or just before an error). Additionally or alternatively, the system can link instances of human error to particular instructional blocks based on operator actions that yielded these errors and actions described in instructional blocks. Yet alternatively, a supervisor may manually link an instance of human error to a particular instructional block in a particular digital procedure (e.g., to failure to fully comprehend an instruction in this particular instructional block). The computer system can then adjust a minimum instruction guidance specification for a particular instructional block—when served to a user, group of users, or all users in a facility, etc.—based on rate or frequency of human error linked to this particular instructional block, as described below.

However, the computer system (and/or the mobile device) can access an error log containing existing human error metadata in any other format or generated in any other way. Furthermore, the computer system (or the mobile device) can generate human error metadata in any other way based on historical digital procedure results.

The computer system can regularly recalculate this user-specific minimum instruction guidance specification based on error rates in additional instances of digital procedures completed by this user over time, such as by weighting more recent errors above older errors.

10.2 Individual User

The computer system can then set a minimum instruction guidance specification for an individual user based on historical error data available for this user. For example, for a new user for whom little or no historical digital procedure result data is available, the computer system can set a high minimum instruction guidance specification, such as a requirement that instructions in all instructional blocks performed by the user be served to the user in video format or that instructions served to the user exceed a guidance level greater than a high threshold (e.g., "80/100"). As the user completes instances of digital procedures in the facility over time, the computer system can reduce the minimum instruction guidance specification for the user if the user's error rate is low or decreasing, thereby enabling the user the opportunity to "earn" access to less invasive instructional content by properly performing these procedures.

In particular, if the user's error rate is low or diminishing for a particular instructional block in a particular digital procedure, the computer system can reduce the minimum instruction guidance specification for this particular instructional block. For example, in Block S180, the computer system (or the mobile device) can: access an historical record of instances of the digital procedure performed previously by the user; detect errors related to a particular instructional block during instances of the digital procedure performed previously by the user based on this historical record; and set the minimum instruction guidance specification for the user—for this particular instructional block in this current instance of the digital procedure—proportional to a rate of errors related to the particular instructional block during past instances of the digital procedure performed by the user.

Additionally or alternatively, the computer system can group similar instructional blocks in the same digital procedure or across multiple digital procedures (e.g., taring a scale, recording a numerical value from a dial on a machine) and reduce the minimum instruction guidance specification for these similar instructional blocks across this one digital procedure or set of digital procedures if the user's error rate for these instructional blocks is low or diminishing. Alternatively, the computer system can set a high minimum instruction guidance specification for a digital procedure as a whole and then reduce this "global" minimum instruction guidance specification for the user over time as the user's total number of errors per complete instance of this digital procedure drops over time.

Conversely, as the rate of human error in instances of a particular instructional block, a group of similar instructional blocks, a particular digital procedure, or all digital procedures performed by the user over time increase, the computer system can increase the minimum instruction guidance specification for this particular instructional block, this group of similar instructional blocks, this particular digital procedure, or all digital procedures performed by the user until this error rate begins to diminish or returns to a low or null rate.

Therefore, the computer system can set the minimum instruction guidance specification for a particular instructional block, a family of similar instructional blocks, a whole digital procedure, or all digital procedures performed by the user proportional to the user's human error rate (e.g., ratio of human errors to all instances, or human error frequency) in this particular instructional block, family of similar instructional blocks, digital procedure, or all digital procedures thus performed by the user over time. Later, the computer system can serve this minimum instruction guidance specification to the user's mobile device in preparation for initializing a new instance of a digital procedure for completion by the user.

Additionally or alternatively, the mobile device (or the computer system) can adjust a minimum instruction guidance specification for the user in real-time during an instance of a digital procedure based on recent human errors during this instance of the digital procedure. For example, if the user errs during a first instructional block in which instructional content was served to the user at a first guidance level but the error was not catastrophic to the procedure, the mobile device can: automatically increase the minimum instruction guidance specification for the next instructional block in the digital procedure; and selectively serve an instruction in this next instructional block—to the user—in a format corresponding to a higher level of guidance.

The mobile device can continue to implement this elevated minimum instruction guidance specification (e.g., according to corrective action/preventative action protocols) during the remainder of this instance of the digital procedure or reduce this minimum instruction guidance specification throughout this instance of the digital procedure if the user's subsequent error rate remains low or null. For example, after assigning a high minimum instruction guidance specification to a user for a particular instructional block in a current instance of a digital procedure, the computer system can: access a result of the particular instructional block in the current instance of the digital procedure performed by the user; and reduce the minimum instruction guidance specification for this user—for this instructional block in a next instance of the digital procedure—separately from other operators in the facility if this result excludes any errors. The computer system can repeat the process for each additional instance of the digital procedure performed by the user.

10.3 Similar Users

In another implementation, the computer system implements similar methods and techniques to set a minimum instruction guidance specification—such as specific to an instructional block, a type of instructional block, or digital procedure—for a group of operators exhibiting similar characteristics. For example, the computer system can group operators in the facility by age, general experience (e.g., years employed at the facility), procedural experience (e.g., number of instances of all digital procedures completed), or procedure-specific experience (e.g., number of instances of a particular digital procedures completed). Additionally or alternatively, the computer system can group users by: mobile device preferences (e.g., tablet, tablet with headphones, or augmented reality headset); instruction format preferences; and/or data capture preferences. The computer system can then retrieve human error data for operators within a group; calculate an absolute rate of human error or a rate of change in frequency of human error among operators in this group; and then implement methods and techniques described above to set a high minimum instruction guidance specification for this group if the error rate for this group is high or increase the minimum instruction guidance specification for this group if the error rate for this group is increasing (e.g., in order to ensure that operators in this group receive just-in-time retraining), and vice versa.

Furthermore, for a new user entering the facility and for whom minimal historical digital procedure data is available, the computer system can identify a group of operators most similar to the user and then assign minimum instruction guidance specifications from this group to the user by default.

For example, the computer system can: identify a subset of operators, in a population of operators affiliated with the facility, who exhibit characteristics similar to the user and who are associated with previous instances of the digital procedure; calculate an aggregate errors rate for the first instructional block in previous instances of the digital procedure performed by the subset of operators; set a minimum instruction guidance specification for the first instructional block in the digital procedure for the subset of operators proportional to the aggregate errors rate; assign the minimum instruction guidance specification for the first instructional block in the digital procedure to the user based on similarity to the subset of operators; and serve the minimum instruction guidance specification to a mobile device in preparation for performance of a new instance of the digital procedure by the user. As the user completes more instances of digital procedures in the facility over time, the computer system can customize minimum instruction guidance specifications to the user's individual performance, as described above.

In the foregoing example, the computer system can also group operators by aggregate error rate, types of instructional blocks occurring during or leading up to human errors, or specific instructional blocks in particular digital procedures occurring during or leading up to human errors by operators in this group. The computer system can then implement methods and techniques described above to assign minimum instruction guidance specifications to groups of operators en masse based on their aggregate error rates.

The computer system can regularly recalculate group-specific minimum instruction guidance specifications based on error rates in additional instances of digital procedures completed by these operators over time. However, the computer system can implement any other method or technique to define a group-specific minimum instruction guidance specification.

10.4 All Users

Additionally or alternatively, rather than group operators by similarity and then set minimum instruction guidance specifications for a group of operators based on their historical error rates, the computer system can instead implement similar methods and techniques to set one common minimum instruction guidance specification or one common set of minimum instruction guidance specifications (e.g., for particular instructional blocks, instructional block types, or digital procedures) for all operators employed or present in the facility.

Therefore, if error rates for a particular instructional block, instructional block type, or digital procedure or error rates for all digital procedures performed in the facility increase, the computer system can increase a corresponding facility-wide minimum instruction guidance specification in order: to ensure that all operators in the facility receive just-in-time retraining for instructional blocks that have resulted in increased error; and to ensure that operators not producing such errors are aware of the increased error rate and are thus available to assist retraining other operators who are producing such errors.

The computer system (or the mobile device) can implement similar methods and techniques to adjust minimum instruction guidance specifications for an entire company, a site, a department, a building, or a team, etc. based on historical error rate data for corresponding populations of operators.

The computer system can implement similar methods and techniques to enforce minimum instruction guidance specifications: set manually for the facility (or entire company, site, department, building, team, group, individual user, etc.), such as until training by each individual user is qualified (e.g., at indicated manually by an administrator or determined automatically based on procedure results). Similarly, the computer system can enforce higher minimum instruction guidance specifications for a preset duration of time or until a measured quality or result for a digital procedure is resolved according to corrective action/preventative action protocols.

10.5 Revision-Controlled

In one variation, the computer system can also increase a minimum instruction guidance specification for a digital procedure as a whole when a new revision of this digital procedure is published within the facility in order to ensure that operators are made aware of this revision and retrained accordingly. Similarly, when a new revision of a digital procedure is published with a change to a particular instructional block, the computer system can increase a minimum instruction guidance specification for the particular instructional block. The computer system can then assign this increased minimum instruction guidance specification to the first instance of this revised digital procedure performed by all operators in the facility. As a user completes instances of this revised digital procedure over time, the computer system (or mobile device) can continue to implement this increased minimum instruction guidance specification if this user's error rate for this current digital procedure revision is higher than the user's error rate for the preceding digital procedure revision(s). However, if this user's error rate for the current digital procedure revision is near or less than the user's error rate for the preceding digital procedure revision (s), the computer system (or the mobile device) can label the user as retrained on this digital procedure revision and reduce the minimum instruction guidance specification for the user when performing this revised digital procedure accordingly.

In another example, the computer system (or the mobile device) can set a minimum instruction guidance specification for a revised digital procedure based on a duration of time that this revised digital procedure has been deployed in the facility. For example, the mobile device can: access a digital procedure corresponding to a current revision of a process for a machine in the facility; initialize a new, local instance of the current revision of the digital procedure; retrieve a time interval between the current revision of the process and a preceding revision of the process for the machine in the facility; and set a minimum instruction guidance specification for the user inversely proportional to this time interval, thereby enforcing higher levels of guidance for more recent digital procedure revisions and lower levels of guidance for older digital procedure revisions. The mobile device (or the computer system) can implement similar methods and techniques to set a minimum instruction guidance specification for a digital procedure revision proportional to a number of instances that the digital procedure revision was performed, such as by a particular user, group of operators, or all operators in the facility.

In this implementation, the computer system can also maintain an audit trail of digital procedure revisions published in the facility and results—including rates of human error—of instances of these digital procedure revisions. For example, after each instance of a digital procedure performed in the facility, the computer system can: append an audit trail for a process represented by the digital procedure with: a date of this instance of the digital procedure; an identifier of a user who performed the instance of the digital procedure; an identifier of the current revision of the digital procedure; and formats of instructions served to the user by default and alternative instruction formats elected by the user during each instructional block in this instance of the digital procedure. The computer system can then group and process these digital procedure revision and error rate data to identify: revisions that yielded low initial error rates; minimum instruction guidance specifications that drove high error rates down to low error rates; time intervals for reducing error rates after digital procedure revisions are published; types or revisions that yield large and small changes in error rates; etc. The computer system can then leverage these derived data to preemptively increase minimum instruction guidance specifications for particular users, groups, or all operators in the facility when a digital procedure revision is first published in the facility in order to preempt increased error rates in instances of the digital procedure revision.

However, the computer system can implement any other method or technique to define a minimum instruction guidance specification. The computer system can also generate a minimum instruction guidance specification matrix for: an entire company, site, department, building, team, facility, group of similar operators, and/or individual user; and a particular instructional block, type of instructional block, digital procedure, or all digital procedures, as shown in FIGS. 1 and 2.

2. Software Content Database

The method S100 described above can be implemented in conjunction with a software content database structure related to multi-layered content that contains logic and information embedded into step-by-step instructions for use in regulated industries and environments. The software content database can include an instructional step block including a text layer, a media layer, a capture layer, a logic layer, an input layer, a notes layer, a spatial layer, an operator layer, an organizational layer, a language layer, a safety layer, an utilities layer, an equipment and materials layer, a devices layer, a service layer, a metadata layer, a sensor data layer, an integration layer, an approval layer, a training layer, a regulatory layer, a review layer, a quality layer, a rules layer, a signature layer, a security layer, an artificial intelligence layer, a Blockchain layer, and a robotics spatial positioning layer. The software content database can include a block containing all layers of information. The block can be created and/or adjoined with other a blocks to form a step-by-step instructions and/or work instructions procedure for an operator using a display device, preferably a mobile display device. The operator can perform an operation, which can be monitored by a monitoring system, which can recognize a step being performed and add template blocks to a work instruction, batch record, and/or log for an action being performed. Additionally, and/or alternatively a sequence of blocks can be generated based on the actions an operator performs, which is captured within a working space by a monitoring system.

2.1 Applications

A system implementing the software content database structure can display work instruction content on mobile devices. Each work instruction step can include a multi-layered block, which contains content, logic, and/or meta-data. This is to provide a better structure for Manuals step-by-step instructions. A monitoring system can be implemented for determining what steps from the work instructions the operator is performing. Additionally the monitoring system can build a procedure from template and/or generated blocks as he or she are performing a procedure.

In particular, the application relates to a software content database structure pertaining to multi-layered content, containing logic, meta-data, positional data, and information embedded into step-by-step instructions for use in regulated industries and environments. The software content database includes an instructional step block including a text layer, a media layer, a capture layer, a logic layer, an input layer, a notes layer, a spatial layer, an operator layer, an organizational layer, a language layer, a safety layer, an utilities layer, an equipment and materials layer, a service layer, a metadata layer, a sensor data layer, an integrations layer, an approval layer, a training layer, a regulatory layer, a review layer, a rules layer, a security layer, an artificial intelligence layer, a Blockchain layer, and a robotics spatial positioning layer. The software content database can include a block containing all layers of information. The block can be created and/or adjoined with other a blocks to form a step-by-step instructions for an operator using a display device, preferably a mobile display device. The operator can perform an operation, which can be monitored by a monitoring system, which can recognize a step being performed and add template blocks to a work instruction, batch record, and/or log for an action being performed. Additionally, and/or alternatively a sequence of blocks can be generated based on the actions an operator performs, which is captured within a working space by a monitoring system.

Step-by-step instructions in the form of Standard Operating Procedures (SOP's), batch records, work instructions, laboratory notebooks, and such are widely used for training in regulated industries such as the field of bioprocessing, biopharmaceutical, pharmaceutical, laboratory, chemical, food and beverage, and industrial setups. Step-by-step instructions are currently implemented throughout most industries in the form of paper documentation. Limited areas implement electronic batch records or documentation and even fewer implement electronic documentation and content formatted for heads up displays. The application described here provides a software content database structure for overcoming issues with the formatting of electronic documentation for use with mobile devices, heads-up displays, augmented reality, virtual reality, and mixed reality work instructions.

2.2 System

According to one aspect, a system is provided. The system includes: a software content database structure pertaining to multi-layered content wherein the content is used to provide instructional information. The instructional step block is a basic unit for performing digital step-by-step procedures. The instructional step block can include a set of layers containing different data structures within each layer. Instructional step block layers can contain different types of data.

2.3 Text Layer

A text layer provides text of the step-by-step instructions. The text can be basic text, rich text with bold characters, subscript and superscript, colors and fonts, as well as contain Unicode characters such as ASCII images and Emoji. The text can be formatted to contain Checklists, which are confirmed by the operator using an input device and/or input method and are recording in the audit trail logs as confirmed for completing a task.

2.4 Media Layer

A media layer provides images, photos, videos, haptic, and/or 3D content. Step instructions within the media layer can be provided as a 3D step wherein the user implements a mobile device, a heads-up display, an augmented reality device, a virtual reality, and/or a mixed reality device to view the 3D content. 3D models and/or 3D animations can be implemented to demonstrate to the user the work instructions as part of the instructional step block layer. The media layer can contain a content manager that provides version control and approval that the content to be used in the procedures or training has been qualified as relevant for performance of the step and is the most recent approved version of the content that is available.

2.5 Capture Layer

A capture layer provides photo capture, video capture, voice capture, barcode capture, label/OCR capture, handwriting/OCR recognition capture, screen/OCR capture, volume capture, and other capture elements.

2.6 Logic Layer

A logic layer provides the sequence of how the procedure steps, blocks, block segments, and/or actions are performed. The logic layer can support option decisions, jumping around to different sections, search within the procedure, linking within the procedure or different documents, links to different modules associated with the procedure, moving in loops if actions need to be repeated if a value fails to meet a required specification, or moving branches if a value or decision requires a different series of steps to be performed. The logic layer can be displayed visually as a flowchart so the relationships and connections between individual instructional block steps using logic are understood.

2.7 Input Layer

An input layer where multiple input types can be implemented to enter in the value of the data, result, decision, or option selected. In this case an operator can choose what input type is most appropriate for the situation including but not limited to a keyboard input, a stylus input, a mouse input, a button input, a touchscreen input, a controller input, a voice capture input, a long-form voice capture input, a gesture input, an eye-tracking input, a brain control interface (BCI) input, a haptic input, a computer vision input, a photo input, a video input, a barcode scan input, an RFID scan input, an integrated input, or other input type. These inputs can display the data and allow the operator the opportunity to retake the data or to make changes prior to entering into the system. Some of these inputs such as the long-form voice capture input transcription can require editing to ensure it is correct in the system. The transcribed text can be edited but all changes are version controlled with the history and original voice capture file accessible in the audit trail logs. In regulatory compliant systems the previously captured data can not be deleted but is available and superseded in the audit trail logs as the data provided in the records and reports.

2.8 Notes Layer

A notes layer captures notes related to an ad-hoc capture, a deviation, or a change to a specified process. The notes can require a signature if it is a deviation in a section of the procedure. The rules of the signatures can be linked to the type of data or steps the note impacts. If the note includes a simple reminder note it can not require a signature, if the note is part of a step, which requires a performer signature then the performed can need to sign-off on any changes to the process, if the step requires a performer and verifier signature then the note can require both signatures, if the note includes a deviation for a critical step it can require a supervisor's signature, if the note includes a fundamental change to the procedure or process it can require a supervisor's signature and a signature from a member or head of the Quality Assurance group. Notes dealing with deviations or process changes can be subject to full regulatory compliance requirements, such as Good Manufacturing Process (GMP) requirements in pharmaceutical manufacturing facilities. Notes not impacting the performance of the procedure such as a reminder to fix an issue, a reminder to review a section, or a reminder to perform an action after a particular event can be stored in a non-GMP compliant database based on the rules and policy of the individual company.

2.9 Spatial Layer

The spatial layer contains the regional, facility, floor, suite, room, and equipment-based mapping to provide directionality, directions, and spatial instructions for completing the steps within a procedure. The spatial layer can contain predefined 3D scanned maps of a facility or room or it can contain 3D models of the equipment which can be localized utilizing a localizing anchor such as a visual anchor (fiducial image), an electronic anchor (such as a Bluetooth beacon), or other localization method. The spatial layer can provide step instructions overlaid positionally where the operation for the step needs to be performed such as the physical location of where the component needs to be inserted onto a piece of equipment.

2.10 Operator Layer

An operator layer determines which operator meets all training requirements and is available to be assigned to a task, such as through a scheduler or as the assignment of work tasks. The operator layer can be subdivided into company, site location, department, building, team, etc. This can be used to provide multiple methods to add operators to a work task such as being directly assigned by a supervisor to perform a task, to include a computer system assign a task based on the operator's skills, seniority, and availability, to hand-off a procedure to a different operator, to add operators in an ad-hoc or informal way such as scanning, inputting, or adding trained operators to a list of people who performed a step. The operator's layer can be implemented to prevent an operator from performing a task assigned to someone else and/or by blocking them from signing off on verifying and/or reviewing tasks that she already performed or signed off on as a performer.

2.11 Organizational Layer

The organizational layer contains the way blocks, steps, and procedures are organized into higher level processes such as by campaigns, programs, clinical trials, batches, lots, unit operations, and so on. The organizational layer can contain information about higher-level schedule planning, number and type of campaigns planned for a multi-year schedule, facility utilization, lot and batch sizing, and other primary planning resources. The organizational layer can provide the management reporting structure to determine which departments and teams report to the supervisors in the organizational structure of a company or group.

2.12 Language Layer

A language layer can contain different languages versions for the procedure instructions where the operators can select a preference in viewing. This is particularly for multinational companies which can utilize the same procedure in different regions with different languages or translations required. This language layer can alter the audio files used with different media file types such as a different audio clip which is language specific in a media clip such as a video, animation, or augmented reality content. The language layer can additionally contain custom dictionaries and/or lexicons with industry specific words such as scientific and/or chemical names as well as company or department specific dictionaries with R&D, drug product, chemical, or other specific naming or nomenclature related to the process. The language layer can also contain phonetic dictionaries of operator's names, which may have difficulty being recognized from direct translations to voice commands.

2.13 Safety Layer

A safety layer can contain just-in-time safety information about the area, component, material, or machine the operator may be working in a step within a procedure. This can include a safety warning prior to the performance of a step to have caution about temperature, pressure, chemicals, radioactivity, pinch points, cutting blades, adhesives, noise, lasers, lock-out/tag-out, hazards, or other safety warnings. The safety layer can instruct the operator to utilize additional personal protective equipment or have access to safety equipment prior to performing the step. The safety layer can additionally contain work safety requirements for a particular region or site within the organization such complying with Occupational Safety and Health Administration (OSHA) safety requirements in the United States and complying with European Agency for Safety and Health at Work (EU-OSHA) requirements for sites in Europe. Other safety requirements such as union safety rules, ergonomic positioning, required personal protective equipment, and mandatory breaks can be included within the platform using the safety layer.

2.14 Utilities Layer

A utilities layer can contain calculators, formulas, timers, units converters, notifications, messaging applications, e-mail notifications, schedulers, simulators, and other useful utilities for an operator to execute a step function.

2.15 Equipment and Materials Layer

An equipment and materials layer contains the barcode information, equipment location, equipment specifications, calibration information, parent-and-child relationships between sub-components and sub-assemblies, notification if the equipment is currently in use or undergoing maintenance, equipment simulators for menu screen navigation, linked documentation to the equipment such as the operator's manuals, consumables, Datasheets, Validation Guides, Extractables reports, Certificates of Quality Release (CoA's), re-order information, and inventory assignment. The equipment layer can be implemented to reserve equipment or to sign it out as a resource. The equipment and materials layer can additionally keep track of timers associated with equipment where she provide the time a piece of equipment was cleaned/sterilized and what time that equipment needs to be implemented by prior to being required to re-clean/re-sterilize it. The equipment and materials layer can be used as a materials management section where it can additionally be implemented for tracking consumable components, raw materials, and materials/solutions created such as keeping track on timers for a solution mixed with a limited useful shelf-life.

2.16 Devices Layer

A devices layer connects mobile devices implemented by the operator and/or the accessory devices connected to the mobile devices and/or networked through a wired and/or wireless connection. The mobile devices can include but are not limited to a tablet, a smart phone, a smart glasses, a heads-up-display, a networked display, an audio display device, a haptic display device, a display device integrated into personal protective equipment, or other device used by the operator. Accessory devices can include but are not limited to a camera, an external camera, a borescope, a gyroscopic camera, a 360 degree camera, a depth scanning device, a 3D scanning device, a time-of-flight (ToF) camera, a LIDAR device, a thermal camera, a multi-spectral camera, a radio frequency sensing device, an ultrasonic sensing device, a keyboard, a stylus, a microphone, or other sensing device. This devices layer can provide the information about the mobile devices including the software version, the operating system version, the plugin types, the controls for accessory devices, such as the robotic controls for a gyroscopic camera, the selection of devices to view by the operator or the selection of accessory devices to provide for an input into the platform.

2.17 Services Layer

A service layer contains the maintenance, Metrology/Calibration, and/or equipment vendor can store equipment data, such as maintenance and preventive maintenance schedules, maintenance history, and equipment usage logs. This is valuable to link the steps in a procedure performed with the actual usage of a piece or series of equipment. Time stamped usage metrics can be captured for the amount of wear-and-tear on a machine is based on the testing types and time used from the procedure instances performed. The procedure can include a timer assigned for the equipment usage such as a piece of equipment is run for 'X' amount of time (start step-end step, Step 1 to Step X, or procedure start/end). This can determine the total usage of an individual piece of equipment and provide automated messages to a Service group internal/external for providing service on particular components depending on timers for service set to that equipment. This can include the changing of a motor belt after 'Y' hours of service or the scheduled inspection of bearings after 'Z' hours of usage to prevent unplanned downtime on critical equipment.

2.18 Metadata Layer

A metadata layer stores metadata, such as user information, protocol data, device serial number, MAC address, IP address, time stamps, equipment ID's, GPS location within facility, WiFi access point connection ID and strength, localization and tracking data relative to fixed and/or mobile objects, and coordinates for the location in a facility (x, y, z, parameters) in 3D at a particular time in space.

2.19 Sensor Data Layer

A sensor data layer collects and stores data from external sensors and integrates with a secure communication method into the platform. The sensor data layer can provides real-time sensor data information displayed to the operator as she are localized near the system where the sensor is located and/or the sensor data can be implemented as a timepoint and/or range for insertion into the procedure, audit trail logs, batch record, form, report, or other document type to ensure the sensor data is within the specification range for performing the process. The sensor layer can shuttle the data from the network of external sensors to a database such as an electronic batch record (EBR) system or an electronic lab notebook (ELN) system. Machine learning can be implemented to correlate sensor data with batch run/continuous processing.

2.20 Integrations Layer

An integrations layer interfaces with the variety of database systems used within a process such as with document management systems, Enterprise Resource Planning (ERP) Systems, Manufacturing Execution Systems (MES), Distributed Control Systems (DCS), Programmable Logic Controller (PLC) systems, electronic lab notebook (ELN) systems, electronic batch record (EBR) systems, inventory management systems, material management systems, equipment management systems, calibration systems, learning and training management systems, and other database system types.

2.21 Approval Layer

An approval layer stores quality approval of the procedure creation of the instructional procedures. This includes the review process for the procedure creation, the most current version of procedures, the testing of the draft procedure and any associated comments or notes, any previous versions of procedures with markup, the review and signature tracking, the locked final release version, the version control, and the renewal review schedule.

2.22 Training Layer

A training layer where training records are available for approving and/or qualifying that an operator may have access in the platform to perform a procedure. The training layer can include the tracking that the operator fully read the procedure, that the operator viewed the relevant content including video clips, 3D models, AR/VR training, that the operator completed any questions linked to the procedure proving she had an understanding of the procedure, the passing of the qualification of the procedure, which can be performed in an automated method or by using an observer, the signoff by a trainer, manager or supervisor, and for tracking and informing the operator on updated procedure versions and/or the renewal period of the procedure.

2.23 Regulatory Layer

A regulatory layer where the guidelines for regulatory compliance can be configured for each company, group, dept, depending on what the operator is working on (GMP/non-GMP), regulatory agencies (FDA, EMEA, . . . ), and her regulatory requirements (HIPAA, OSHA, . . . . ). Some processes can include both regulated capture and databases for tasks performed in operation while other databases are non-regulatory compliant such as notes in a review process, internal messaging, and reminders.

2.24 Review Layer

A review layer where the procedure instances of the steps performed, the documents, batch records, forms, logs, or reports can be automated to identify open fields, which either need to be filled out or listed as not applicable (N/A) and/or a manual review process where the procedure instance is reviewed through a controlled process of document hand-off, notes (GMP and non-GMP), and signature tracking.

2.25 Quality Layer

A quality layer, which provides a human readable format for all procedure steps, all automated sequences, all computer vision captures, and all artificial intelligent/machine learning decisions to be able to confirm a procedure instance follows all of the regulatory requirements for the process performed. This quality layer would allow for a quality person to review all steps performed in the procedure instance and confirm it was performed as the correct way, which is critical for maintaining the quality of the process performed and for the validation of the process utilizing the platform.

2.26 Rules Layer

A rules layer provides the generalized rules followed by a company, site, department, team, group or area. These can include configurable items such as the number of significant figures, which are captured from electronic balances using computer vision. In this layer a rule can be set that the number of significant figures is X.XXX, which goes out to the thousandths place but can be configured to the hundredths place for balances that only go out 2 significant digits. These rules can be configurable and exceptions can be available for some mathematical formulas and equations that require it. The rules layer can additionally provide signature rules and policy rules for an organization. It includes items that are generally required but can be changed in a configuration when an exception is needed.

2.27 Signature Layer

A signature layer allows for the capture of different signature types including by the Performer of the step and/or procedure instance, the Verifier of the step and/or procedure instance, which is required before the performer can perform any additional steps in the sequence, confirmed by, which includes a verification the operator performed the activity but does not prevent the performer from performing additional steps in the sequence, Supervisor Signature where a manager or supervisor is required to sign, and a QA Signature in, which an outside department or group such as the Quality group is required to sign off prior to executing or completing the procedure. The signature layer can capture the user name and password for the operators in the platform. The signature layer can also hold the biometric data for operators providing a biometric authentication method such as through fingerprint authentication, voice authentication, retinal authentication, iris authentication, facial recognition authentication, or other biometric authentication method.

2.28 Security Layer

A security layer tracks the security requirements configured for each company, group, department, depending on security requirements for the type of procedures performed. This can include different ways of encrypting the data, the location of the storage of data such as on-premises only for the most sensitive of data but within a private cloud for less sensitive information and the WiFi network structure for the site location.

2.29 Artificial Intelligence Layer

An artificial intelligence layer provides answers to natural language questions within an instructional step block, machine learning, pattern recognition, pre-emptive warnings based on timing where other operators at similar levels get stuck and are requested if she want more information. The Artificial intelligence layer can confirm that an operator correctly performed an action and/or confirmed a mathematical calculation was correct for a batch record.

2.30 Blockchain Layer

A Blockchain layer provides a Blockchain ledger of audit trail for company and regulatory agency verification, encryption. Blockchain layer can be implemented in marketplace for buying, selling, trading, and custom-building media rich content procedures with 3rd party users and/or companies.

2.31 Robotics Spatial Positioning Layer

A robotics spatial positioning layer where the operator captures the spatial positional information, which may include data from the spatial layer, for use in providing automation to robotic systems in performing step instructions in real-time and/or from a recorded capture session. In this robotics spatial positioning layer, the operator may train a robotic system to perform a step in a certain way and may define physically what the spatial and/or force tolerances are. A monitoring capture system can additionally capture the spatial positioning of an operator performing a step and can process and translate that spatial positioning for the operation of a robotics system for mimicking the operator's performance of the step.

2.32 Instructional Step Blocks

The instructional step blocks and/or instructional procedures can be provided as an instance and/or contain an instance layer. During an instance the instructional step block can be joined by multiple users. Some users can simply monitor the operator performing the task for quality Assurance purposes, other users can approve a process has been completed correctly as a performer/verifier session. A performer/verifier session operates like a batch record where a step is important enough that it requires verification it was completed correctly. During performer/verifier an operator performs a task from the instructional step blocks and a verifier, which can be another operator, a manager, an external verifier, and/or an Artificial Intelligent system, can confirm the step has been completed properly and provide a digital signature for the audit trail logs and/or batch records. A verifier can oversee multiple operators simultaneously and provide approvals as each operator performs a task where she can see through the external capture device and/or the wearable capture device.

Figure 4A:
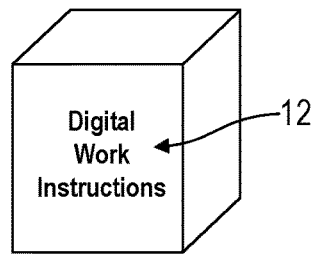
FIGS. 4A, 4B, 4C, and 4D are schematic representations of variations of the method.
Figure 4B:
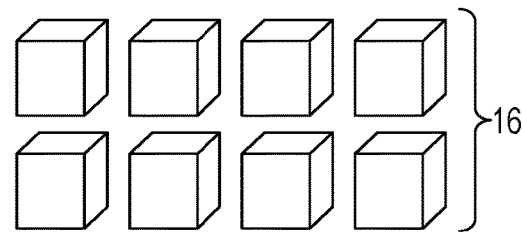
Figure 4B:
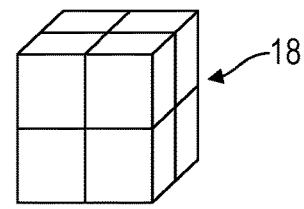
Figure 4C:
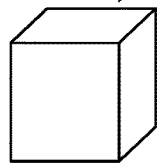
Figure 4C:
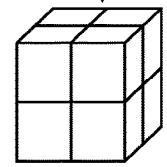
Figure 4C:
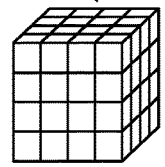
Figure 4C:
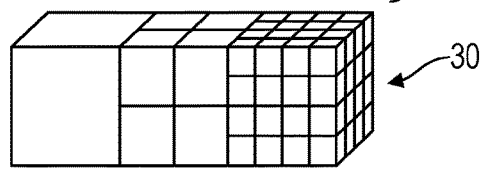
Figure 4D:
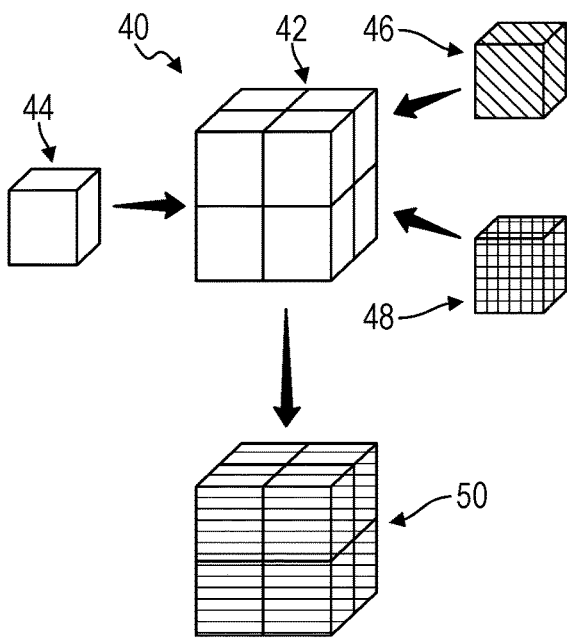

As shown in FIGS. 4A, 4B, 4C, and 4D, the system can implement digital work instruction blocks. FIG. 4A depicts a front view of an instructional step block 10 with an instruction, which in this implementation includes a text-based instruction 12. This is the simplest form of an instructional step block 10. FIG. 4B depicts a front view of a software content database system 14 containing a set of instructional step block layers 16, which form an instructional step block 18 containing multiple data layers. Each of the set of instructional step block layers 16 can contain a different data set or parameters such as an of a text layer, a media layer, a capture layer, a logic layer, an input layer, a notes layer, a spatial layer, an operator layer, an organizational layer, a language layer, a safety layer, an utilities layer, an equipment and materials layer, a service layer, a metadata layer, a sensor data layer, an integrations layer, an approval layer, a training layer, a regulatory layer, a review layer, a rules layer, a security layer, an artificial intelligence layer, a Blockchain layer, and a robotics spatial positioning layer. FIG. 4C depicts a front view of a software content database system 20 containing a set of instructional step blocks 22, 24, and 26, which can be combined to form an instructional procedure 30 for an operator and/or automated system to follow/execute. The individual instructional step blocks 22, 24, and 26 can contain different layer structures where instructional step block 22 can be a simple structure with a single data layer, for example a text-based instruction. Instructional step block 24 can contain multiple data layers such as additional media content (text, photos, audio, video, and 3D content), as well as logic based on user input data and responses compared to set specifications. Instructional step block 26 can contain more complexity and a large number of data layers such as positional data, equipment data, service date sensor data, metadata, regulatory data for conducting and storing information from the process, security data, artificial intelligence responses, Blockchain data storage and encryption, as well as a set of other data types. Data from an inputted value, a captured value, a computed value, an integrated value, and/or a standard value from one instructional step block 22, 24, and 26 can be transferred to populate a field in another instructional step block linked as an instructional procedure. The instructional procedure 30 created from a set of instructional step blocks 22, 24, and 26 can provide a data structure for instructional procedures used with a set of display and input devices within workspaces. FIG. 4D depicts a front view of a software content database system 40 containing a set of instructional step blocks 44, 46, and 48 as well as a set of instructional procedures 42, 50. An instructional procedure 42 can implement instructional step blocks 44, 46, and 48 from a set of disparate procedures (not shown). These disparate procedures can contain the same instructional steps blocks 44, 46, and 48 as existing procedures and are linked to instructional procedure 42. In this implementation an instructional procedure 42 for performing an integrity test for a sterilizing grade filter implements an already existing instructional step block 44 from a filter wetting procedure, which originates from a different procedure (not shown). The instructional procedure 42 for performing an integrity test for a sterilizing grade filter can additionally include instructional step blocks 46, 48 linked from other procedures for assembling a filter housing and for usage of a filter integrity testing device. The instructional procedure 42 can further link to another existing instructional procedure 50 as part of and/or at the completion of the procedure, which in this implementation is an instructional procedure 50 on properly recording integrity testing results and reporting depending on whether the values from the testing passed or failed the specifications in place. In another implementation, an instructional step block (not shown) can be added to the instructional procedure 50 after an event has occurred, such as dropping a filter and breaking it, which can trigger a cascade of new steps to be performed. Under normal circumstances these events, which can be rare but can occur at some regular interval, can be incorporated into the overall procedure and marked as not applicable during every instance of performing the procedure. With the flexible structure of the instructional blocks the module related to the dropping of a filter would only be added to the procedure being performed only in the event it actually occurs. After a software content database system 40 is sufficiently large, limited changes and inputs can be enabled as most instructional steps blocks 44, 46, and 48 types can already exist within the database to form new procedures. Instructional step blocks 44, 46, and 48 can be procedurally generated by a processing device to fit all possible instructional scenarios as required. Machine learning and system training can be implemented within the software content database system 40 to create the structure for a procedural instructional step block creation system.

2.33 Monitoring System

A monitoring system can be implemented to include the operator perform the steps to complete a task for an operation and the monitoring system tracks and records the operator while building instructional step blocks based on how the operator performs a task. If the operator is monitored in real-time the capture device and/or the input device can implement the positional information from the operator performing the task to direct an automation/robotic system to perform the operator directed task remotely utilizing the instances for instructional step blocks. In this implementation an operator can join remotely from another facility, in another region, or anywhere globally and control an automation/robotic system. The operator can sign onto an application where she can provide credentials, qualifications and/or training records and be selected to perform a work task remotely in real-time. A platform can be setup to link viable operator candidates with the types of systems and/or the types of work instruction tasks from the instructional step blocks. This real-time remote performance would be for scenarios where an instructional step block requires a knowledge worker to make decisions about the tasks and/or is performed in an area dangerous for the operators, such as in an explosion proof room.

A monitoring system can alternatively be implemented to include the operator perform the steps to complete a task for an operation and the monitoring system tracks and records the operator's positional information while building instructional step blocks based on how the operator performs a task. These files can be saved as an instructional step block and implemented by an automation/robotic system to perform that work task at any time point from the recorded session. This would be for scenarios where an instructional step block is repetitive and does not require a knowledge worker to make decisions.

Instructional step blocks can alternatively be procedurally generated based on the machine learning of existing steps in a large database to cover all possibilities for similar future procedures. A monitoring system can pull these procedurally generated instructional step blocks when monitoring an operator by similarity search and linking those blocks where the operator performs a task, which matches the procedurally generated step block. These procedurally generated instructional step blocks can be linked and/or joined together to form a complete instructional procedure.

Figure 5:
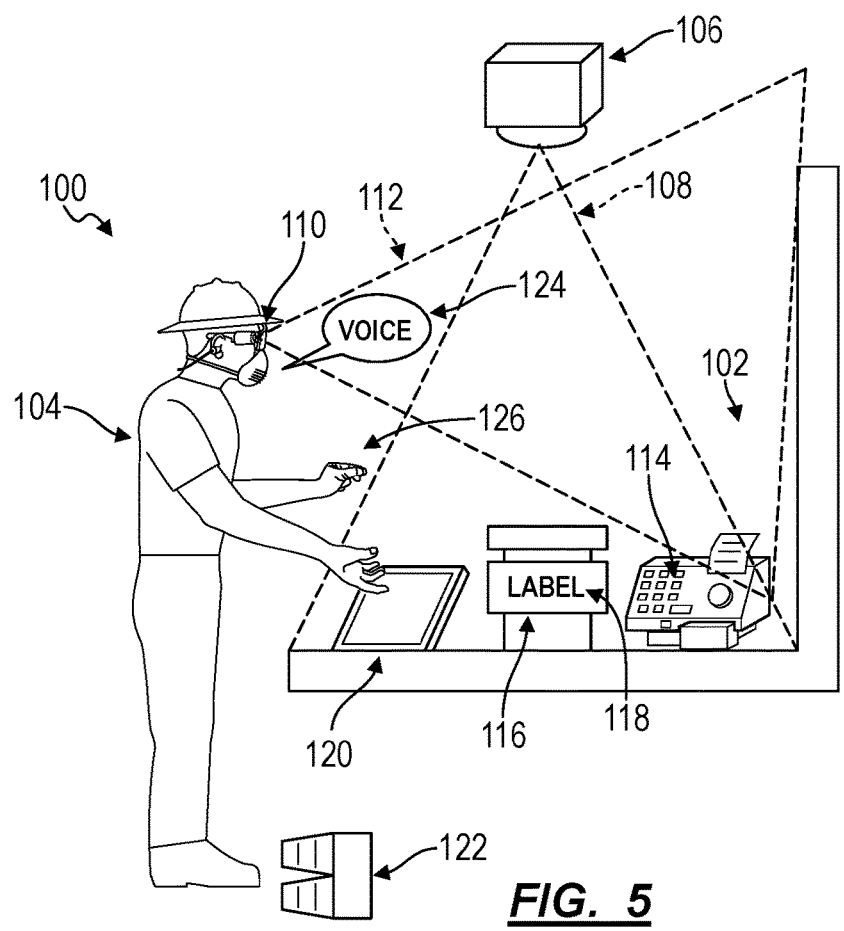
FIG. 5 is a flowchart representation of one variation of the method.

As shown in FIG. 5, the system can include a monitoring system for the creation of a set of instructional step blocks and instructional procedures. FIG. 5 depicts a front view of a monitoring system 100 containing a working space 102, an operator 104, a capture device 106, 110, and an input device 120, 122. A set of instructional step blocks can be created in the software content database system using a monitoring system 100, which captures the movements of the operator 104 and inputs such as from input devices 120, 122, voice commands/inputs 124, and/or gestures 126, media content associated with the actions of the operator, and positional information for the products, equipment, and/or consumables she implement in the performance of a work step. The monitoring system 100 can contain a capture device, which includes a camera, depth scanning, or other sensor-based capture system where data from the working space is captured, processed by a processing device (not shown), and stored in a local and/or remote (cloud) database. In this implementation there is an external capture device 106, which is preferably a camera array setup containing a set of lenses and processing devices capture an area 108 within a working space 102 from multiple angles. In this implementation the operator 104 has a wearable capture device 110, which captures an area 112. This wearable capture device 110 can include an augmented reality smart glasses, virtual reality headset, mixed reality headset, a wrist-worn and/or watch based wearable device, and/or a wearable device with a sensor-based capture device capturing data in a working space 102. The operator can implement an input device to interact with the software content database system and/or can implement the monitoring system to capture user input data to interact with the software content database system. The input device can be a touchscreen device 120 preferably a touchscreen device with a protective cover on it, which can be replaced as needed and/or in alternative implementations preferably can contain a sterilizable single-use input device, which can be mounted onto the touchscreen input device and disposed of after batches or as needed. The input device can additionally or alternatively include a wireless foot pedal device, which can advance through and confirm the step-by-step instructions hands-free without needing to touch any input devices with the operators hands in the working space. The operator can additionally implement the input devices on the wearable device 110, such as buttons, a touchpad, and or through voice input 124. The external monitoring system 106 within the capture space 108 and/or the wearable capture device 110 within the capture space 112 can additionally and/or alternatively be implemented to track and register operator hand movements and/or gestures 126 and/or the proximity of at least 2 or more materials and/or the assembly of at least 2 or more materials. The operator 104 can be performing a procedure in a working space 102 with a material 116, an equipment 114 and/or a consumable (not shown). The material 116 can contain a chemical, which can be in a solid, liquid, and/or gas state. This material 116 can be in a container, vial, or other holder. This material 116 can contain a label 118, which can contain a barcode, a datamatrix code, a QR code, a positional marker, and/or an augmented reality marker. A set of additional labels and/or markers can also be placed throughout the working space 102, on a material 116, on an equipment 114, and/or on a consumable (not shown). The equipment 114 can be implemented as part of the procedure capturing by the external capture device 106 and/or the wearable capture device 110 in the working space 102 by the operator 104. As the operator 104 performs a procedure within the capture space 108, 112 using the material 116, an equipment 114, and the consumable (not shown) the capture systems 106, 110 captures the positional information of how the operator moves her hands, materials, equipment, and consumables. The operator 104 can additionally provide voice commentary of the steps being performed and/or include the voice captured and turned into text, which is implemented to build instructional step blocks within the instructional procedures. The operator 104 can additionally implement an input device 120, 122, a voice input command 124 and/or a gesture 126 to add layers, such as logic layers, capture layers, and/or configuration layers to the instructional step blocks. In alternative implementations at least two operators can generate a procedure while performing an action where one operator is designated the performer and the other operator is designated the controller. In this another implementation, the performer performs the work task in the working space with a monitoring system 100 where the controller works separately at a control panel and/or console on a computing device (not shown) to start, stop and edit the captured content, such as photos, video, audio, 3D content and can type in the instructional steps manually to build the procedure and or instructional blocks.

2.34 Uploader

An uploader can be implemented to convert existing documents into instructional step blocks. In this implementation an existing document as a Word document, a PDF file, and/or other document type can be loaded into the uploader program where the document is subdivided into steps based on delimiters, content, and/or the content density of the display device. A large multi-page SOP procedure can be broken down into its constituent paragraphs and sentences based on the numbering and bullet point headings. Each of these can be broken down into individual instructional step blocks and linked and/or assembled to form a complete instructional procedure.

2.35 Software Program

A software program and/or machine learning can be implemented to measure content density depending on the display device the content can be viewed on. For a relatively small display device such as monocular smart glasses, smart phones, smart watches, and/or other wearable devices content needs to be constrained to fit the limited viewing window available to the operator. If the operator is viewing the content on a laptop, tablet, and/or wall screen device then content density could be increase to fit more content on a screen at any one time. Frame analysis can be performed to measure content density by subdividing a display screen into N number of sections and determining how many of those subdivided sections contain text and/or viewable content. Scoring can be provided for highly dense content on smaller devices with recommendations on further subdividing the text and/or media content within the instructional step block into multiple instructional step blocks.

Figure 6:
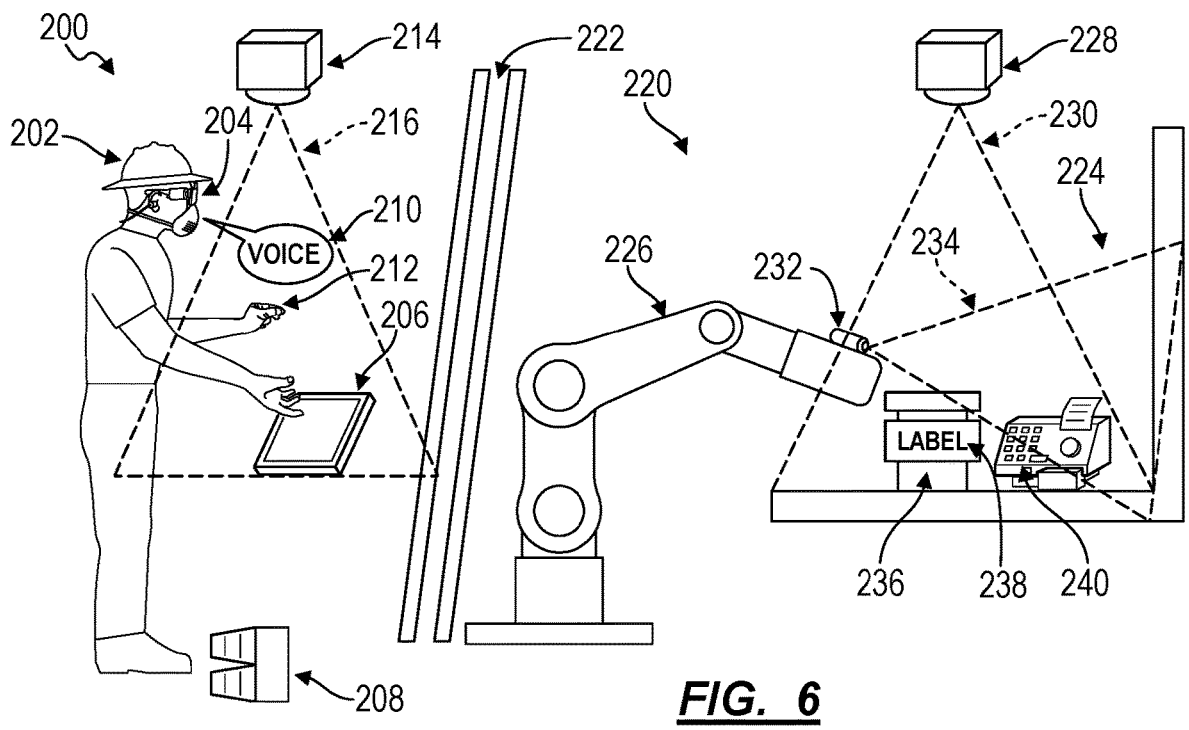
FIG. 6 is a flowchart representation of one variation of the method.

As shown in FIG. 6, the monitoring system can execute a set of instructional step blocks and instructional procedures utilizing a robotic system. FIG. 6 depicts a front view of a monitoring and automation system where an operator 202 is located in a working space 200. The operator is separated from the second working space 220 by a barrier 222, is operating from a remote location, such as working space 200, and or performed the task at an earlier time where the positional data has been collected and is being executed at a later time by an automation system 226. The least one operator 202 performs tasks in the working space 200, is monitored by a capture device 204, 214, and an input device 206, 208. The capture device 204, 214 captures the positional data for the operator's 202 movements within the capture space 216. This positional data along with data from the touchscreen input device 206, the pedal input device 208, the wearable device 204 input device, the at least voice input 210 and/or the gesture control 212 is captured and is translated into movements for a robotic system 226, which can be local in a sterile and/or hazardous environment, is operated remotely by the operator 202 and/or has a session, which is recorded and is executed at a later time by the automation and/or robotic system 226. The working space 224 for the automation and/or robotic system 226 contains a robotic system 226, a monitoring capture device 228, 232, a capture space 230, 234, a material 236, an equipment 240, and/or a consumable (not shown). The operator 202 in a workspace 200 can be operating the automation system 226 in a different workspace 224 either locally and/or remotely in real-time. The instructional step blocks (not shown) and/or the instructional procedure can include a session layer where an operator 202 and potentially multiple operators can join. Within the session the operator 202 can provide the positional movements of the automation system using a capture device 204, 214 and/or an input device 206, 208 and/or an input method 210, 212. The working space for the automation/robotic system 226 can include an external capture device 228, which captures an area 230 and/or a capture device 232 with a capture area 234 to provide visual and positional information to the remote operator 202. The operator 202 can alternatively be capturing the positional data for performing a work instruction in a virtual space, which is recorded, stored in the system database as a positional layer for the instructional step blocks, and executed by an automation/robotic system 226.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a operator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for controlling dissemination of instructional content to operators performing procedures at equipment within a facility, the method comprising:
    at a computing device associated with a user, accessing a digital procedure corresponding to a current revision of a process for an equipment unit in the facility and containing a first instructional block comprising a first instruction in a set of formats, the set of formats comprising:
        a text format corresponding to a first degree of guidance;
        an audio format corresponding to a second degree of guidance different from the first degree; and
        a visual format corresponding to a third degree of guidance greater than the first degree and the second degree;
    retrieving a time interval between the current revision of the process and a preceding revision of the process for the equipment unit in the facility;
    accessing a list of operators affiliated with the equipment unit in the facility, the list of operators comprising the user;
    setting a minimum instruction guidance specification for the list of operators inversely proportional to the time interval;
    accessing the minimum instruction guidance specification assigned to the user for a current instance of the digital procedure at the computing device;
    in response to initiation of the first instructional block in the digital procedure, presenting the first instruction in a particular format, in the set of formats, corresponding to a particular degree of guidance approximating the minimum instruction guidance specification;
    in response to selection of additional guidance for the first instruction, presenting the first instruction in a second format, in the set of formats, corresponding to a degree of guidance greater than the particular degree; and
    in response to completion of the first instructional block, initiating a second block in the digital procedure.

2. The method of claim 1, wherein accessing the digital procedure comprises accessing the digital procedure containing the first instructional block comprising the first instruction in the set of formats comprising:
    the text format comprising a textual description of a first process step in the digital procedure;
    the audio format corresponding to the second degree of guidance greater than the first degree and comprising an audio recording of a voice describing the first process step; and
    the visual format comprising a video clip depicting performance of the first process step.

3. The method of claim 2:
    wherein presenting the first instruction in the particular format to the user at the computing device comprises playing back the audio recording by default according to the minimum instruction guidance specification in response to initiation of the first instructional block; and
    wherein presenting the first instruction in the second format comprises:
        during playback of the audio recording at the computing device, receiving selection of further guidance for the first instruction; and
        playing back the video clip in response to selection of further guidance for the first instruction.

4. The method of claim 3:
    wherein accessing the digital procedure comprises accessing the digital procedure containing the first instructional block comprising the first instruction in the set of formats further comprising an augmented reality overlay corresponding to a fourth degree of guidance greater than the third degree; and
    further comprising:
        during playback of the video clip recording at the computing device, receiving selection of further guidance for the first instruction; and
        in response to selection of further guidance for the first instruction, rendering the augmented reality overlay, aligned to features on a machine proximal the user, on an eyes-up display worn by the user.

5. The method of claim 1, wherein accessing the minimum instruction guidance specification assigned to the user comprises:
    accessing an historical record of instances of the digital procedure performed previously by the user;

based on the historical record, detecting errors related to the first instructional block during instances of the digital procedure performed previously by the user; and setting the minimum instruction guidance specification for the user, for the first instructional block in the current instance of the digital procedure, proportional to a rate of errors related to the first instructional block during instances of the digital procedure performed previously by the user.

6. The method of claim 1, further comprising, at a computer system:

identifying a subset of operators, in a population of operators affiliated with the facility, exhibiting characteristics similar to the user and associated with previous instances of the digital procedure;

calculating an aggregate errors rate for the first instructional block in previous instances of the digital procedure performed by the subset of operators;

setting the minimum instruction guidance specification for the first instructional block in the digital procedure for the subset of operators proportional to the aggregate errors rate;

assigning the minimum instruction guidance specification for the first instructional block in the digital procedure to the user based on similarity to the subset of operators; and serving the minimum instruction guidance specification to the computing device.

7. The method of claim 1, further comprising appending an audit trail for the process with:

a date of the current instance of the digital procedure;
an identifier of the user;
an identifier of the current revision of the process; and
the second format of the first instruction selected by the user during the first instructional block.

8. The method of claim 1, further comprising:

accessing a result of the first instructional block in the current instance of the digital procedure; and in response to the result excluding errors, reducing the minimum instruction guidance specification for the user, for a next instance of the digital procedure, separately from other operators on the list of operators.

9. The method of claim 1:

wherein accessing the digital procedure comprises accessing the digital procedure containing a sequence of blocks comprising the first instructional block of a first instructional block type and the second block of a second instructional block type;

wherein accessing the minimum instruction guidance specification assigned to the user comprises:

accessing an historical record of instances of a set of digital procedures performed previously by a group of operators within the facility, the group of operators comprising the user, the set of digital procedures comprising the digital procedure;

based on the historical record, calculating a frequency of errors related to instructional blocks of the first type during instances of the set of digital procedures; and setting the minimum instruction guidance specification for the group of operators, for blocks of the first type, proportional to the frequency of errors related to instructional blocks of the first type.

10. The method of claim 9:

wherein initiating the second block in the digital procedure comprises, in response to completion of the instructional block, initiating the second block comprising a second instruction in the set of formats; and further comprising:

accessing a second minimum instruction guidance specification assigned to the user for blocks of the second type, the second minimum instruction guidance specification for blocks of the second type less than the minimum instruction guidance specification for blocks of the first type; and in response to initiation of the second block in the digital procedure:

selecting a second particular format from the set of formats corresponding to a second particular degree of guidance approximating the second minimum instruction guidance specification; and presenting the second instruction in the second particular format to the user.

11. The method of claim 1, wherein accessing the minimum instruction guidance specification assigned to the user comprises:

accessing an historical record of instances of a set of digital procedures performed previously by a group of operators within the facility, the group of operators comprising the user, the set of digital procedures comprising the digital procedure; and in response to detecting a deviation event in the historical record, the deviation event related to the first instructional block during a previous instance of the digital procedure, setting the minimum instruction guidance specification for operators in the facility, for the first instructional block, for a predefined time interval.

12. The method of claim 1:

further comprising:

at a computer system, accessing an electronic document for a procedure in the facility;

identifying a sequence of steps specified in the electronic document;

for each step in the sequence of steps:

extracting an instruction in the text format for the step;

initializing a block, in a set of blocks, for the step;

populating the instructional block with the instruction in the text format for the step;

compiling the set of blocks, comprising the first instructional block, into the digital procedure;

serving the digital procedure to a second computing device associated with an operator for completion of a first instance of the digital procedure in the facility;

at the second computing device, recording a media file of completion of the first instance of the digital procedure at a machine in the facility;

segmenting the media file into a set of media clips; and populating each block in the set of blocks with a corresponding media clip in the set of media clips; and wherein accessing the digital procedure at the computing device comprises accessing the digital procedure comprising the set of blocks comprising instructions in the text format and the set of media clips.

13. The method of claim 12, further comprising, for the first instructional block in the set of blocks:

transforming the first instruction in the text format into a first audio clip of an automated voice reciting the first instruction in the text format; and storing the first audio clip as the first instruction in the audio format in the first instructional block.

14. The method of claim 1, wherein accessing the digital procedure at the computing device comprises:
tracking a location of the computing device within the facility;
detecting a set of machines proximal the computing device based on the location of the computing device within the facility;
retrieving a list of digital procedures associated with the set of machines;
rendering the list of digital procedures on a display of the computing device; and
loading the digital procedure from a database to the computing device in response to selection of the digital procedure, from the list of digital procedures, by the user.

15. The method of claim 1:
wherein initiating the second block comprises, in response to completion of the first instructional block, initiating the second block comprising a second capture block configured to record data in a set of capture formats comprising:
manual data entry into the computing device;
manual image capture at the computing device; and
automatic image capture by the computing device;
accessing a capture mode specification assigned to the current instance of the digital procedure; and
further comprising, during the second capture block, prompting the user to record data in capture formats, in the set of capture formats, based on the capture mode specification.

16. The method of claim 15, wherein accessing the capture mode specification assigned to the current instance of the digital procedure comprises:
accessing an historical record of instances of the digital procedure performed previously by the user;
based on the historical record, detecting errors related to the second capture block during instances of the digital procedure performed previously by the user; and
defining the capture mode specification for the user to specify a quantity of capture formats for the second capture block in the current instance of the digital procedure proportional to a rate of errors related to the second capture block during instances of the digital procedure performed previously by the user.

17. The method of claim 1, further comprising:
recording a user-elected format, in the set of formats of the first instruction in the first instructional block, selected by the user during the current instance of the digital procedure; and
during a second instance of the digital procedure succeeding the current instance of the digital procedure at the computing device:
accessing an updated minimum instruction guidance specification assigned to the user for the second instance of the digital procedure; and
in response to initiation of the first instructional block in the digital procedure during the second instance of the digital procedure:
in response to the user-elected format corresponding to a degree of guidance less than the updated minimum instruction guidance specification, presenting the first instruction in a second particular format, in the set of formats, corresponding to a second particular degree of guidance approximating the updated minimum instruction guidance specification; and in response to the user-elected format corresponding to a degree of guidance greater than the updated minimum instruction guidance specification, presenting the first instruction in the user-elected format by default.

18. A method for controlling dissemination of instructional content to operators performing procedures at equipment within a facility, the method comprising:
at a computer system, accessing an electronic document for a procedure in a facility;
identifying a sequence of steps specified in the electronic document;
for each step in the sequence of steps:
extracting an instruction in the text format, corresponding to a first degree of guidance, for the step;
initializing a block, in a set of blocks, for the step; and
populating the instructional block with the instruction in the text format for the step;
compiling the set of blocks into the digital procedure according to an order of the sequence of steps defined in the electronic document;
at a first time:
serving the digital procedure to a second computing device associated with an operator for completion of an initial instance of the digital procedure in the facility;
at the second computing device, recording a media file of completion of the initial instance of the digital procedure at a machine in the facility; and
segmenting the media file into a set of media clips;
for a first step, in the sequence of steps, comprising a first instruction in the text format:
accessing the first instruction depicted in a second format corresponding to a second degree of guidance different from the first degree; and
accessing the first instruction depicted in a third format corresponding to a third degree of guidance greater than the first degree and the second degree comprises retrieving a first media clip, in the set of media clips, corresponding to the first block in the digital procedure;
appending a first block, in the digital procedure, corresponding to the first step with the first instruction depicted in the second format and the first instruction depicted in the third format comprises loading the first media clip into the first block;
setting a minimum instruction guidance specification, defining the third degree of guidance for the first instruction, for the first block; and
at a second time proceeding the first time, serving the digital procedure to a first computing device for presentation of the first media clip to the user, by default over the first instruction in the text format and the first instruction in the second format, during the first block in the digital procedure according to the minimum instruction guidance specification.

19. The method of claim 18:
wherein accessing the first instruction depicted in the second format comprises accessing the first instruction in an audio format corresponding to the second degree of guidance greater than the first degree;
wherein accessing the first instruction depicted in the third format comprises accessing the first instruction in a video format corresponding to the third degree of guidance; and
further comprising, at the first computing device:
initiating a current instance of the digital procedure;

accessing the minimum instruction guidance specification;

in response to initiation of the first instructional block in the digital procedure:
  selecting a particular format, from a set of formats depicting the first instruction in the first instructional block, corresponding to a particular degree of guidance approximating the minimum instruction guidance specification; and
  presenting the first instruction in the particular format to the user;

in response to selection of additional guidance for the first instruction, presenting the first instruction in a second format, in the set of formats, corresponding to a degree of guidance greater than the particular degree; and in response to completion of the first instructional block, initiating a second block in the digital procedure.

20. A method for controlling dissemination of instructional content to operators performing procedures at equipment within a facility, the method comprising:

at a computing device associated with a user, accessing a digital procedure containing a first instructional block comprising a first instruction in a set of formats, the set of formats comprising:
  a text format corresponding to a first degree of guidance;
  an audio format corresponding to a second degree of guidance different from the first degree; and
  a visual format corresponding to a third degree of guidance greater than the first degree and the second degree;

identifying a subset of operators, in a population of operators affiliated with the facility, exhibiting characteristics similar to the user and associated with previous instances of the digital procedure;

calculating an aggregate errors rate for the first instructional block in previous instances of the digital procedure performed by the subset of operators;

setting a minimum instruction guidance specification for the first instructional block in the digital procedure for the subset of operators proportional to the aggregate errors rate;

assigning the minimum instruction guidance specification for the first instructional block in the digital procedure to the user based on similarity to the subset of operators;

serving the minimum instruction guidance specification assigned to the user for a current instance of the digital procedure to the computing device;

in response to initiation of the first instructional block in the digital procedure, presenting the first instruction in a particular format, in the set of formats, corresponding to a particular degree of guidance approximating the minimum instruction guidance specification;

in response to selection of additional guidance for the first instruction, presenting the first instruction in a second format, in the set of formats, corresponding to a degree of guidance greater than the particular degree; and in response to completion of the first instructional block, initiating a second block in the digital procedure.

21. A method for controlling dissemination of instructional content to operators performing procedures at equipment within a facility, the method comprising:

at a computing device associated with a user, accessing a digital procedure containing a sequence of blocks comprising a first instructional block of a first instructional block type and a second instructional block of a second instructional block type, the first instructional block comprising a first instruction in a set of formats, the set of formats comprising:
  a text format corresponding to a first degree of guidance;
  an audio format corresponding to a second degree of guidance different from the first degree; and
  a visual format corresponding to a third degree of guidance greater than the first degree and the second degree;

accessing a minimum instruction guidance specification assigned to the user for a current instance of the digital procedure at the computing device comprising:
  accessing an historical record of instances of a set of digital procedures performed previously by a group of operators within the facility, the group of operators comprising the user, the set of digital procedures comprising the digital procedure;
  based on the historical record, calculating a frequency of errors related to instructional blocks of the first instructional block type during instances of the set of digital procedures; and
  setting the minimum instruction guidance specification for the group of operators, for instructional blocks of the first instructional block type, proportional to the frequency of errors related to instructional blocks of the first instructional block type;

in response to initiation of the first instructional block in the digital procedure, presenting the first instruction in a particular format, in the set of formats, corresponding to a particular degree of guidance approximating the minimum instruction guidance specification;

in response to selection of additional guidance for the first instruction, presenting the first instruction in a second format, in the set of formats, corresponding to a degree of guidance greater than the particular degree; and in response to completion of the first instructional block:
  initiating a second instructional block in the digital procedure comprising a second instruction in the set of formats;
  accessing a second minimum instruction guidance specification assigned to the user for instructional blocks of the second instructional type, the second minimum instruction guidance specification for instructional blocks of the second instructional block type less than the minimum instruction guidance specification for instructional blocks of the first instructional block type;
  selecting a second particular format from the set of formats corresponding to a second particular degree of guidance approximating the second minimum instruction guidance specification; and
  presenting the second instruction in the second particular format to the user.

22. A method for controlling dissemination of instructional content to operators performing procedures at equipment within a facility, the method comprising:

at a computing device associated with a user, accessing a digital procedure containing a first instructional block comprising a first instruction in a set of formats, the set of formats comprising:
  a text format corresponding to a first degree of guidance;
  an audio format corresponding to a second degree of guidance different from the first degree; and a visual format corresponding to a third degree of guidance greater than the first degree and the second degree;
at a computer system, accessing an electronic document for a procedure in the facility;
identifying a sequence of steps specified in the electronic document;
for each step in the sequence of steps:
 extracting an instruction in the text format for the step;
 initializing a block, in a set of blocks, for the step; and
 populating the instructional block with the instruction in the text format for the step;
compiling the set of blocks, comprising the first instructional block, into the digital procedure;
serving the digital procedure to a second computing device associated with an operator for completion of a first instance of the digital procedure in the facility;
at the second computing device, recording a media file of completion of the first instance of the digital procedure at a machine in the facility;
segmenting the media file into a set of media clips;
populating each block in the set of blocks with a corresponding media clip in the set of media clips;
wherein accessing the digital procedure at the computing device comprises accessing the digital procedure comprising the set of blocks comprising instructions in the text format and the set of media clips;
accessing a minimum instruction guidance specification assigned to the user for a current instance of the digital procedure at the computing device;
in response to initiation of the first instructional block in the digital procedure, presenting the first instruction in a particular format, in the set of formats, corresponding to a particular degree of guidance approximating the minimum instruction guidance specification;
in response to selection of additional guidance for the first instruction, presenting the first instruction in a second format, in the set of formats, corresponding to a degree of guidance greater than the particular degree; and
in response to completion of the first instructional block, initiating a second block in the digital procedure.

* * * * *